July 8, 1952 H. F. SCHAEFER, JR 2,602,244
COMPUTER FOR AVIATION TRAINERS AND THE LIKE
Filed March 27, 1947 12 Sheets-Sheet 1

H. FREDERICK SCHAEFER, JR.
*INVENTOR.*

BY *Donald T. Hillier*

ATTORNEY

July 8, 1952   H. F. SCHAEFER, JR   2,602,244
COMPUTER FOR AVIATION TRAINERS AND THE LIKE
Filed March 27, 1947                          12 Sheets-Sheet 2

H. FREDERICK SCHAEFER, JR.
INVENTOR.

BY
ATTORNEY

July 8, 1952 H. F. SCHAEFER, JR 2,602,244
COMPUTER FOR AVIATION TRAINERS AND THE LIKE
Filed March 27, 1947 12 Sheets-Sheet 3

H. FREDERICK SCHAEFER, JR
INVENTOR.

BY
ATTORNEY

H. FREDERICK SCHAEFER, JR.
INVENTOR

BY (signature)

ATTORNEY

H. FREDERICK SCHAEFER, JR
*INVENTOR.*

BY Donald T. Hillier

ATTORNEY

H. FREDERICK SCHAEFER, JR
INVENTOR.

July 8, 1952  H. F. SCHAEFER, JR  2,602,244
COMPUTER FOR AVIATION TRAINERS AND THE LIKE
Filed March 27, 1947  12 Sheets-Sheet 11

H. FREDERICK SCHAEFER, JR.
INVENTOR.

BY
ATTORNEY

H. FREDERICK SCHAEFER, JR.
*INVENTOR.*

Patented July 8, 1952

2,602,244

UNITED STATES PATENT OFFICE 2,602,244

COMPUTER FOR AVIATION TRAINERS AND THE LIKE

Hans Frederick Schaefer, Jr., Marblehead, Mass., assignor to Link Aviation, Inc., Binghamton, N. Y., a corporation of New York Application March 27, 1947, Serial No. 737,696

4 Claims. (Cl. 35—12)

My invention relates to grounded equipment for teaching the art of piloting aircraft. Such equipment has been in widespread use for several years, the best known type of such equipment being disclosed in United States Patents 1,825,464 and 2,099,857 issued to Edwin A. Link, Jr. My invention will be described in conjunction with trainers of the type illustrated in the two mentioned United States patents, but upon a reading of the disclosure of my invention it will be readily realized that my invention is equally useful in other types of aviation trainers including trainers of the type having a stationary fuselage.

Grounded aviation trainers in general include a cockpit having a seat for the student pilot, and inside the cockpit are positioned movable rudder pedals and a movable stick or aileron and elevator control, simulating the corresponding flight controls of a real plane. Simulated rudder, elevator and aileron trim tab controls may also be provided. Also, there are provided a simulated throttle lever control, a simulated propeller governor (engine speed) control and a simulated flaps lever. An instrument panel is mounted ahead of the student's seat, and upon this panel are mounted a full complement of instruments simulating the instruments of a real plane. Such instruments include an air speed indicator, altimeter, vertical speed indicator, tachometer, manifold pressure gauge, flaps position indicator, artificial horizon, directional gyro, magnetic compass, radio compass, etc.

Interposed between the manual controls (throttle lever, engine speed lever, flaps lever, rudder pedals, aileron and elevator control) and the instruments on the instrument panel are various selected types of computing mechanisms the purpose of which is to cause the instruments on the instrument panel to register indications at all times dependent upon the combined settings and combined effects of the settings of the various manual controls corresponding to the instrument indications of a real plane of the type being simulated when the manual controls of the plane are set and retained in positions corresponding to the positions of the controls in the trainer.

My invention relates to a completely different and novel form of computing arrangement for interposition between the manual controls and instruments, so that the instruments register correct indications according to the various positions of the manual controls, and so that fuselage movements, when my invention is used in conjunction with a movable fuselage, properly respond to the settings of the manual controls. There are known to the prior art electronic computers, mechanical-electric computers, and pneumatic computers. My invention relates to a mechanical computer including a pivot which is movable in any direction in a given geometrical surface in response to changes in the value of two or more selected input variables, such as throttle lever setting and engine speed lever setting, and the exact position of the pivot in the surface is utilized to measure the value of one or more selected output variables, such as manifold pressure and engine power output. The exact position of the pivot in the surface is transferred, through any suitable means to additional apparatus which is responsive to the exact position of the pivot in the surface.

As will become clear upon a reading of this disclosure, the geometrical surface through which the pivot is moved is preferably a plane, and the position of the pivot in the surface is transferred through mechanical connecting means to other mechanical members which are positioned in accordance with the position of the pivot. However, the geometrical surface may, for example, be conical or spherical in shape, and the means operated by the moving pivot may be other than mechanical.

The correct positioning of the floating pivot may be achieved by the preparation of a graph, plotting lines for at least two selected input variables, and then plotting lines representing the output variable or variables relative to the first plotted input variable lines. Mechanism is then designed which will properly position the pivot along the lines of the graph according to the value input variables, so that the pivot is properly positioned relative to the lines of the output variable or variables for the values of the instant input variables. The output mechanism is connected to the pivot to be positioned by the pivot according to the position of the pivot relative to the output variable line or lines, and the position of this output mechanism may be taken as the true measure of the instant output variable or variables.

This disclosure will show three different embodiments of my invention, the first being an engine computer which has three variable inputs of throttle lever setting, engine speed lever setting and altitude, and the two outputs of manifold pressure and horsepower available. The second computer is the flight computer, which has the two variable inputs of attitude and air speed and the two variable outputs of vertical speed and horsepower required. The third computer is the air speed-engine power turn computer, and has the two variable inputs of air speed and engine power, and the variable output of rate of turn.

In order that my invention may be clearly understood, reference is made to the attached drawing disclosing the preferred embodiment of my invention wherein:

Fig. 1 is a general view of an aviation trainer of the type disclosed in the two above mentioned United States patents, with which my invention will be illustrated.

Fig. 2 is a brake horsepower-manifold pressure graph showing the effects of the independent variables of throttle lever setting, engine speed (R. P. M.) and altitude on the dependent variables of manifold pressure and brake horsepower.

Of the foregoing, Figures 3, 5, 10 and 14 show the exact relative positions of the pivots and the lengths of the links of the embodiment of each of the computers disclosed herein.

Figure 1:
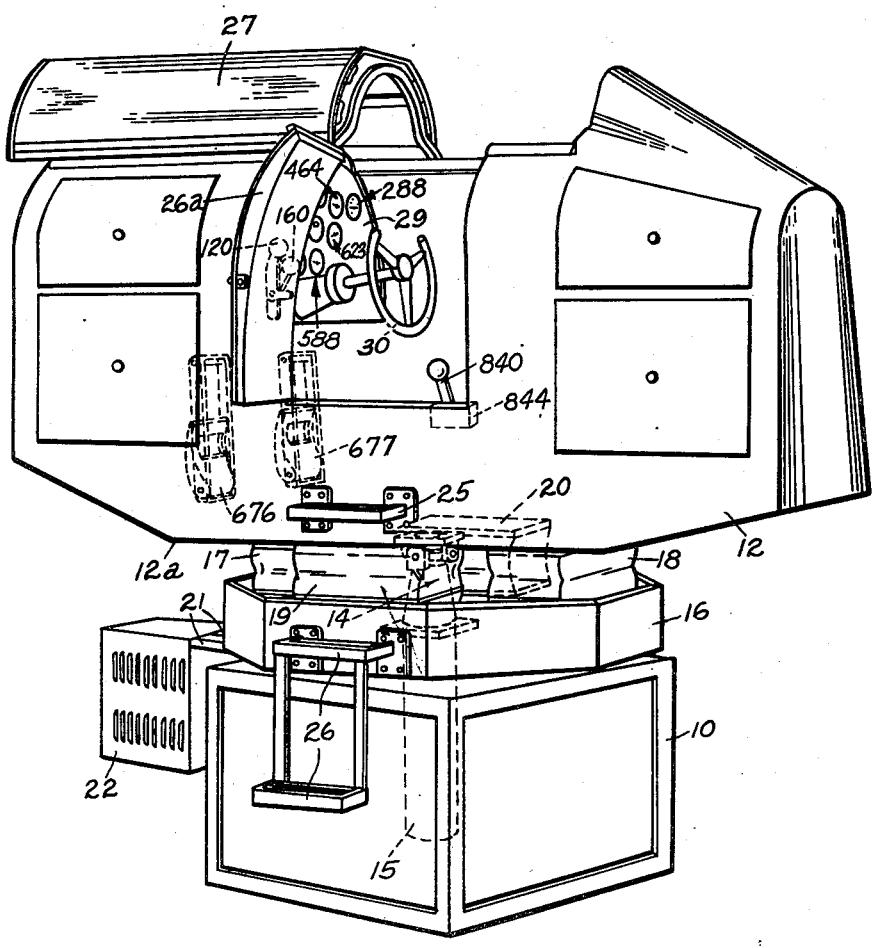

Reference is now made to Fig. 1 which is a general disclosure of grounded aviation trainers of the type covered by U. S. Patents 1,825,462 and 2,099,857. Such trainers comprise a stationary base 10 above which is mounted a fuselage 12 simulating the fuselage of an actual aircraft. Within this fuselage there is a seat for a student positioned to the rear of the control wheel 30. The fuselage 12 rests upon a universal joint 14 and this joint is supported by the main central vertical spindle 15 which is rotatably held by the stationary base 10. The conventional octagon is designated by 16 and as is well known to the prior art, octagon 16 is affixed to the main spindle 15 below the universal joint 14 by means of suitable horizontal arms (not shown) so that the octagon 16 rotates with the spindle 15 and fuselage 12 relative to the stationary base 10.

A forward pitching bellows 17 and a rearward pitching bellows 18 are provided, the bottom portions of each of these bellows being affixed to the arms which hold the octagon 16 relative to the vertical spindle 15, and the upper ends of these bellows are affixed to the bottom 12a of the fuselage 12. These two bellows lie in a vertical plane through the longitudinal center of the fuselage 12. Upon the admission of vacuum to the forward bellows 17 and atmosphere to the rear bellows 18, the former bellows collapses and the latter expands causing the nose of fuselage 12 to be lowered. On the other hand, the admission of vacuum to the rear bellows 18 and of atmosphere to the fore bellows 17 causes the nose of fuselage 12 to rise. As is well understood, the admission of vacuum and atmosphere into the bellows 17 and 18 may be controlled by the student in the trainer by moving the control wheel 30 fore and aft of the fuselage 12, so that the student may control the diving and climbing position of the fuselage 12. The diving and climbing position of the fuselage are sometimes referred to as "pitching."

At the same time trainers of this type have a left banking bellows 19 as well as a right banking bellows 20 upon the opposite side of the universal joint 14 from the bellows 19. The admission of vacuum and air into these bellows may be controlled by the student through a rotation of the control wheel 30 so that he may place the fuselage 12 in any desired banking position within the limits of the apparatus.

Trainers of the type being considered are often equipped with a stick instead of a control wheel, and it will be readily apparent to those skilled in the art, after reading this application, that they can substitute a stick for the wheel 30.

Fixedly carried by the octagon 16 are the horizontal arms 21 which support the turning motor 22. By means of a well known pulley arrangement connecting the turning motor 22 with the stationary base 10, the student in the fuselage 12 may, by pressing either of the rudder pedals 676 or 677, energize the turning motor 22 in such a direction that the turning motor 22, supporting arms 21, octagon 16, bellows 17, 18, 19 and 20, spindle 15, universal joint 14 and fuselage 12 will rotate either to the left or right, as desired, relative to the stationary base 10. Thus the student may control the simulated heading of the fuselage 12 in the same manner that he would control the heading of a plane in actual flight.

The steps 25 and 26 and door 26a allow access to the interior of the fuselage 12 and a slidable canopy 27 may be used to completely encompass the cockpit of the fuselage 12 in order to simulate blind flying conditions. The canopy 27 may be made of a suitable translucent material in order to permit enough light to enter the cockpit of the fuselage to enable the student to manipulate the trainer without the assisance of artificial lights placed in the interior of the fuselage. Such conditions closely simulate day-time blind flight conditions. On the other hand when it is desired to simulate night-time blind flying conditions, a suitable opaque material such as a cover may be placed over the canopy 27 in order that no light enters the cockpit through this canopy. The student must then rely upon the conventional artificial lights which are placed inside the cockpit. Such an arrangement closely simulates nighttime blind flying conditions.

An instrument panel 29 is inside the fuselage and upon this panel are instruments which simulate the instruments carried by actual aircraft. As explained above, these instruments operate in response to simulated conditions just as the corresponding instruments in a real plane react to real flight conditions.

*Engine computer*

Figure 2:
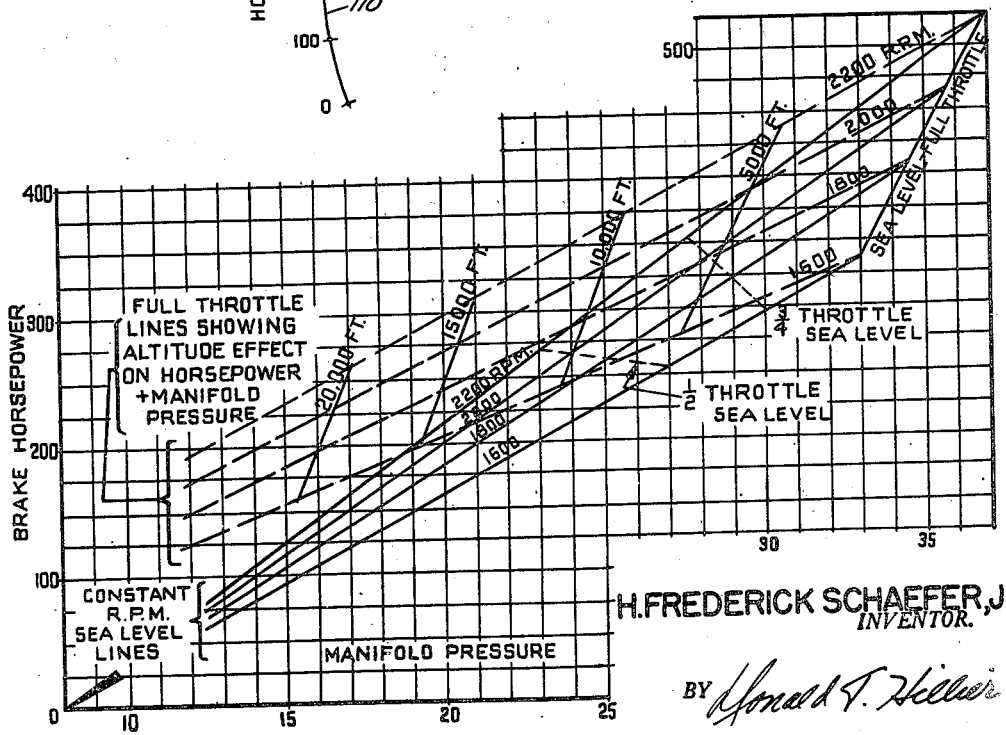

Reference is now made to Fig. 2 which is a brake horsepower-manifold pressure graph showing the effects of independent variables of throttle lever setting and engine speed (R. P. M.) and altitude on the dependent variables of manifold pressure and brake horsepower. On this graph are four constant R. P. M. lines—1600 R. P. M., 1800 R. P. M., 2000 R. P. M. and 2200 R. P. M. These lines assume altitude to be zero, and are labelled "Constant R. P. M.—sea level lines." Drawn across these lines are three throttle position lines, viz., full throttle, ¾ throttle and ½ throttle, each of these three lines being so labelled. The following typical information may be secured from this graph:

FULL THROTTLE

1600 R. P. M. produces
    33″ manifold pressure and 337 brake horsepower
1800 R. P. M. produces
    34½″ manifold pressure and 410 brake horsepower
2000 R. P. M. produces
    35.8″ manifold pressure and 465 brake horsepower
2200 R. P. M. produces
    37″ manifold pressure and 525 brake horsepower

THREE-QUARTERS THROTTLE

1600 R. P. M. produces
    30″ manifold pressure and 295 brake horsepower
1800 R. P. M. produces
    28.8″ manifold pressure and 320 brake horsepower
2000 R. P. M. produces
    28.5″ manifold pressure and 340 brake horsepower
2200 R. P. M. produces
    27½″ manifold pressure and 350 brake horsepower

ONE-HALF THROTTLE

1600 R. P. M. produces
    27″ manifold pressure and 255 brake horsepower
1800 R. P. M. produces
    25″ manifold pressure and 263 brake horsepower
2000 R. P. M. produces
    24″ manifold pressure and 268 brake horsepower
2200 R. P. M. produces
    23″ manifold pressure and 270 brake horsepower Therefore this graph clearly shows the various manifold pressures and brake horsepowers produced at sea level altitude by various combinations of throttle setting and engine speed. Such a graph may be produced by any suitably trained engineer for any selected engine.

Also shown on the same graph are dotted lines showing the effect of altitude upon horsepower and manifold pressure as developed by a full throttle setting at selected engine speeds. For example, at full throttle, 5000 feet, 1600 R. P. M., there is produced 27½ inches of manifold pressure and 280 horsepower. At full throttle, 20,000 feet, 1600 R. P. M., there is produced 15¾ inches of manifold pressure and 165 horsepower.

Having graphed the independent variables of throttle setting, engine speed, and altitude, against the dependent variables of manifold pressure and brake horsepower, the next step is the provision of a computing mechanism including three separate inputs corresponding to the three independent variables and two separate outputs corresponding to the two dependent variables. Any linkage that can move a master pivot in two dimensions through a plane surface may be used. One such form of linkage will now be disclosed.

Figure 3:
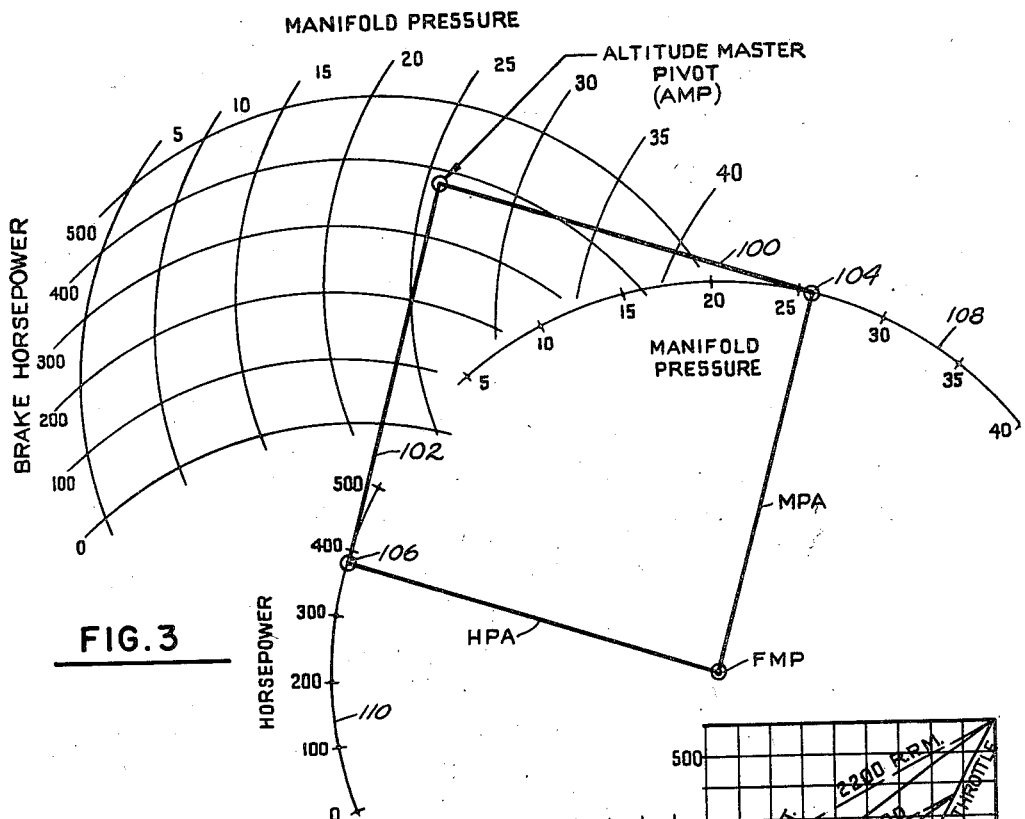
Fig. 3 shows the same information as Fig. 2, replotted in a form adaptable to the design of a suitable computing apparatus, and including a schematic showing of a portion of the engine computer.

Reference is made to Fig. 3 where four links are shown pivoted together to form a rhombus. The rhombus includes the fixed master pivot FMP, the manifold pressure arm MPA, the horsepower arm HPA, the auxiliary links 100 and 102, and the altitude master pivot AMP. The manifold pressure arm MPA has its lower end pivoted at the fixed master pivot FMP, and its other end is pivoted at 104 to the right end of link 100. The left end of link 100 in turn is pivoted to the altitude master pivot AMP, as is the upper end of link 102. The horsepower arm HPA has its left end pivoted to the lower end of link 102 at 106, and the right end of the horsepower arm is pivoted at the fixed master pivot FMP.

Assuming that it is desired to position the manifold pressure arm MPA about the fixed master pivot FMP in accordance with the factor of assumed manifold pressure, the manifold pressure arm MPA may be swung about pivot FMP so that pivot 104 at the upper end of arm MPA describes the manifold pressure arc 108. This arc may then be divided into increments of any suitable amount—in the illustrated case, the increments being five inches of manifold pressure.

By placing pivot 104 about the five inch mark on the manifold pressure arc and swinging the altitude master pivot AMP through its limit of travel, the five inch manifold pressure arc at the left of Fig. 3 will be described. The pivot 104 may successively be placed on the 10, 15, 20, 25, 30, 35 and 40 inch points on the manifold pressure arc 108, and corresponding arcs drawn generally parallel to the five inch manifold pressure arc, by swinging the altitude master pivot AMP.

Assuming that it is desired to position the horsepower arm HPA about the fixed master pivot FMP in accordance with the factor of assumed horsepower, the horsepower arm HPA may be swung about pivot FMP so that pivot 106 at the left end of arm HPA describes the horsepower arc 110. This arc may then be divided into increments of any suitable amount—in the illustrated case the increments being one hundred horsepower.

Then, by placing pivot 106 above the zero, 100, 200, 300, 400 and 500 marks on the horsepower arc 110, the horsepower arcs in the upper left of Fig. 3 may be described by swinging the altitude master pivot AMP, these arcs being generally at right angles to the manifold pressure arcs.

Thereafter, the position of the horsepower arm HPA about the fixed master pivot FMP depends upon the position of the altitude master pivot AMP relative to the horsepower lines of Figs. 3. For example, when the altitude master pivot AMP is at any point along the 300 horsepower arc, pivot 106 will be above the 300 point on the horsepower arc 110, and the horsepower arm HHA will be in the angular position about the fixed master pivot FMP which is selected for an assumed engine power output of 300 horsepower. Similarly, the position of manifold pressure arm MPA about the fixed master pivot FMP depends upon the position of the altitude master pivot relative to the manifold pressure lines of Fig. 3.

Figure 4:
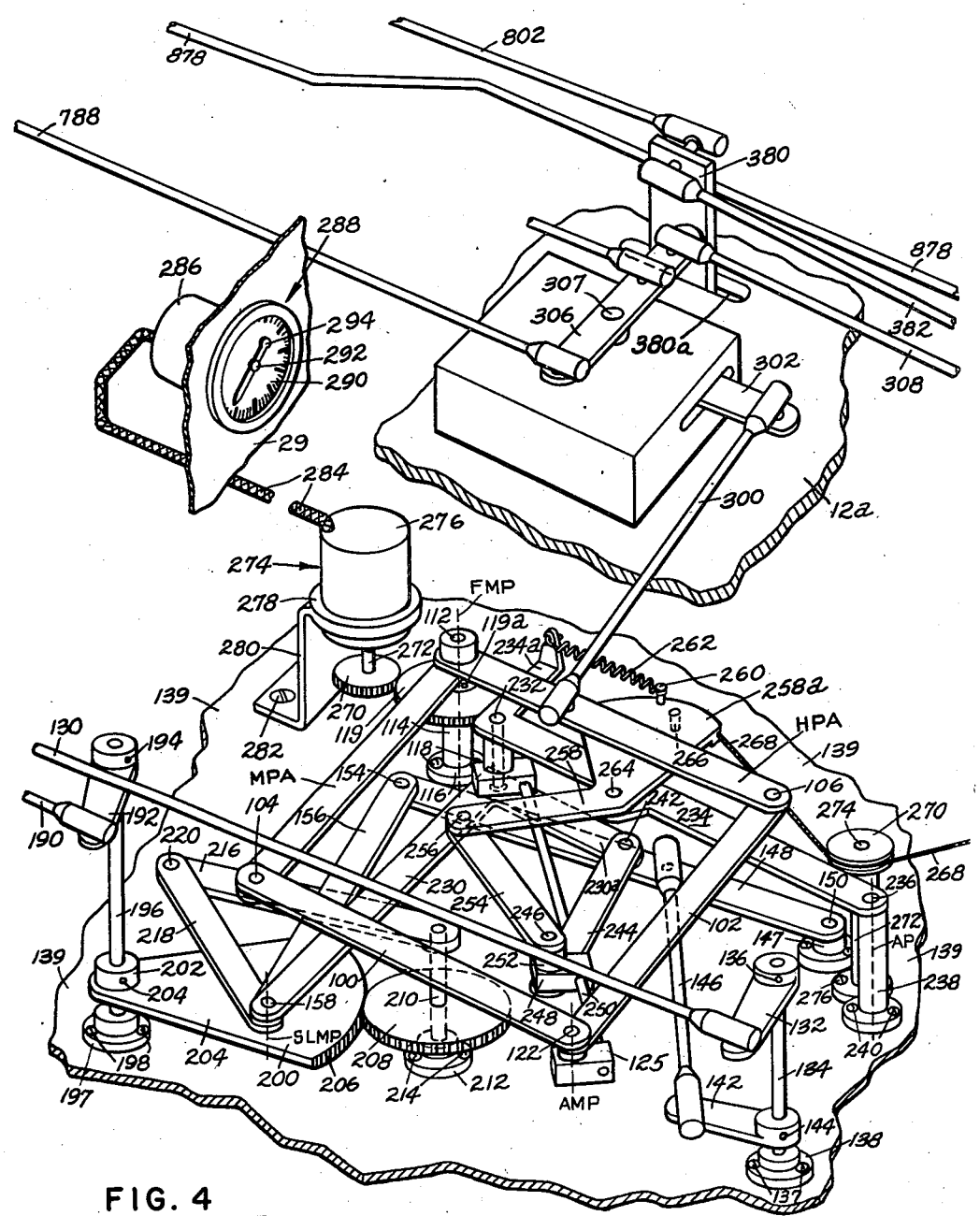
Fig. 4 is a perspective view of the engine computer.

For a disclosure of the actual physical construction of the rhombus structure disclosed in Fig. 3, reference is made to Fig. 4 where the fixed master pivot FMP, the manifold pressure arm MPA, the pivot 104, link 100, the altitude master pivot AMP, the link 102, pivot 106 and the horsepower arm HPA are shown. The fixed master pivot FMP takes the form of a stud 112 fixed to the post 114, the flange 116 of which is affixed by screws 118 to the plate 139 which in turn is affixed to the floor 12a of the fuselage 12. Gear 119 is affixed to spacer 119a which in turn is affixed to arm MPA so that gear 119 rotates with the manifold pressure arm MPA about the fixed master pivot FMP. The altitude master pivot AMP includes the stud 122.

Inasmuch as the position of the altitude master pivot AMP determines the positions of the manifold pressure arm MPA and the horsepower arm HPA, it is necessary that the altitude master pivot AMP be positioned relative to the manifold pressure and horsepower lines on the graph in accordance with the three independent variables of throttle setting, engine speed and altitude. By properly positioning the altitude master pivot relative to the manifold pressure and horsepower lines in accordance with the assumed conditions of throttle setting, engine speed and altitude, the angular positions of the horsepower arm HPA and manifold pressure arm MPA become a correct measure of the instant assumed dependent variables of horsepower and manifold pressure.

Figure 5:
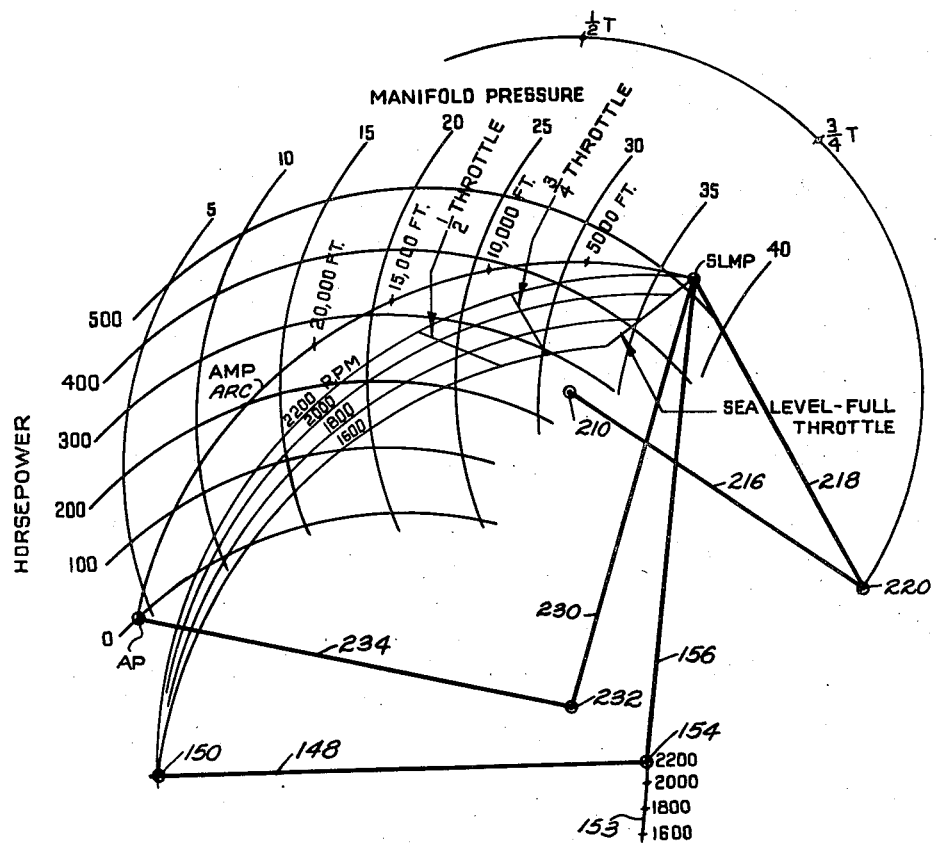
Fig. 5 shows the same information as Fig. 3, together with a schematic showing of certain parts of the engine computer.

Reference is now made to Fig. 5 where the manifold pressure and horsepower arcs previously described in conjunction with Fig. 3 are shown. In addition to the manifold pressure and horsepower arcs, there are also shown in Fig. 5 four sea-level constant engine speed arcs, viz., 1600 R. P. M., 1800 R. P. M., 2000 R. P. M and 2200 R. P. M. Also, the full throttle line, the ¾ throttle line and the ½ throttle line are shown. By comparison of Fig. 5 with Fig. 2, it will be seen that the four sea level constant speed engine lines and the throttle lines in Fig. 5 generally cross the manifold pressure and horsepower arcs at the same values as in Fig. 2. For example, in both Figs. 2 and 5, at sea level, full throttle and 1800 R. P. M., on both graphs there is developed very close to 35 inches of manifold pressure and 410 horsepower. In both Figs. 2 and 5 at sea level, ½ throttle and 2000 R. P. M., there is produced a manifold pressure of 24 inches and a horsepower of about 270 is developed. Each of the R. P. M. arcs is an arc of a circle having its center along the arc 153, the 2200 R. P. M. arc being centered at the 2200 point on arc 153, etc.

Considering first the independent variables of assumed engine speed and assumed throttle lever setting, if the altitude master pivot AMP is positioned along the proper R. P. M. line of Fig. 5 in accordance with the assumed engine speed, or intermediate the R. P. M. lines for intermediate settings, and then the altitude master pivot AMP is positioned along the full throttle line when the throttle lever in the trainer is in the full throttle position, or along the three-quarter throttle line when the throttle lever is in the three-quarter throttle position, or along the one-half throttle line when the throttle lever is in the one-half throttle position, or in any other proper position relative to the three just mentioned lines according to in-between settings of the throttle lever, it will be appreciated that the altitude master pivot will be positioned in such position that the angular position of the manifold pressure arm MPA about the fixed master pivot FMP will be a proper measure of the assumed manifold pressure for the existent throttle lever setting and assumed engine speed, and the altitude master pivot AMP will be positioned so that the angular position of the horsepower arm HPA about the fixed master pivot FMP will be a proper measure of the assumed horsepower output for the existent throttle lever setting and assumed engine speed.

Then, if the position of the altitude master pivot AMP is properly modified according to the factor of assumed altitude, the manifold pressure arm MPA and horsepower arm HPA will have their angular positions about the fixed master pivot FMP properly modified, so that the angular positions of the manifold pressure arm MPA and horsepower arm HPA about the fixed master pivot FMP will be a true measure of the assumed manifold pressure and assumed horsepower output, and the assumed manifold pressure and assumed horsepower output will be dependent upon the factors of assumed throttle lever setting, assumed engine speed and assumed altitude.

First, means will be described for positioning the altitude master pivot AMP in accordance with the factors of assumed engine speed and assumed throttle lever setting, and then means will be disclosed for modifying the position of the altitude master pivot in accordance with the assumed altitude.

Figure 6:
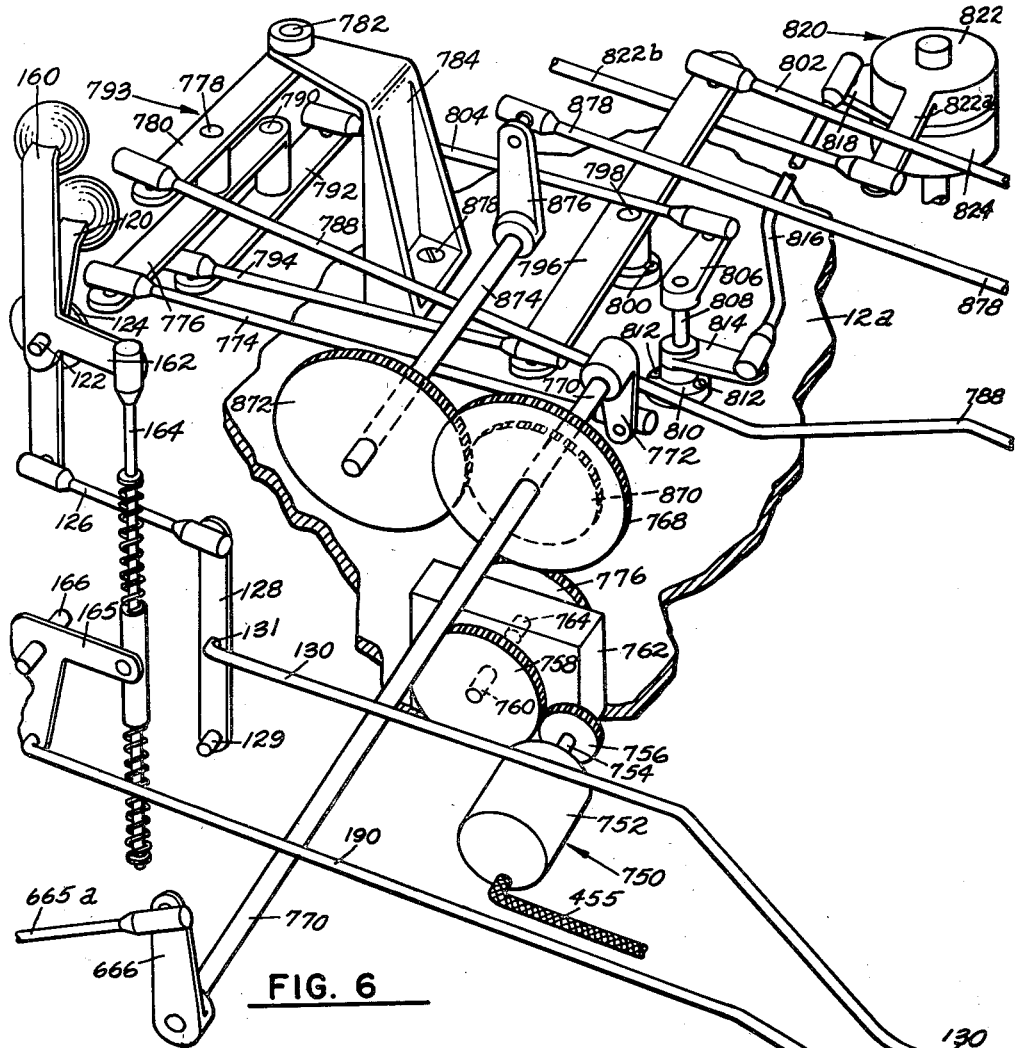
Fig. 6 is a perspective view of a portion of the prior art trainers.

Reference is now made to Fig. 6 where a lever 120 is shown, this lever being pivoted upon stud 122 which is suitably fixed within the trainer fuselage 12 as seen in Fig. 1. This lever represents the engine speed lever or propeller governor control lever of a plane equipped with a constant speed propeller. The setting of the lever, in the case of a real plane, determines the speed at which the engine of the plane runs—the farther ahead the lever is set, the higher the speed at which the engine will run.

The friction disc 124 is fixed upon stud 122 to bear against lever 120 to retain that lever in any position in which it is placed by the student within fuselage 12.

Pivotally attached to the lower end of the engine speed lever 120 is the forward end of link 126, the rear end of which is pivotally attached to the upper end of arm 128 which is pivoted upon the fixed stud 129.

The forward end of link 130 is pivotally attached to the arm 128 at 131, and the rear end of link 130, as seen in Fig. 4, is pivotally attached to the outer end of arm 132 which is affixed upon the upper end of shaft 134 by means of set screw 136. Shaft 134 is rotatably mounted in the bearing housing 138 which is suitably affixed to the plate 139 by screws 137. Arm 142 is affixed upon the lower end of shaft 134 by means of set screw 144, and the lower end of link 146 is pivotally attached to the outer end of arm 142. The upper end of link 146 is pivotally attached to arm 148, the right end of which is pivotally mounted upon the fixed stud 150 which is carried by fixed plate 139 and spaced therefrom by spacer 147. Carried by the left end of arm 148 is the stud 154 which pivotally carries the upper end of link 156, the lower end of which is pivoted upon the stud 158, the vertical axis of which forms the sea level master pivot SLMP.

Considering now Figs. 4 and 6, it will be understood that when the engine speed lever 120 is moved ahead by the student to produce a higher assumed engine speed, the link 126 and upper end of arm 128 move to the rear. The link 130 also moves to the rear, and by parts 132, 134 and 142, the link 146 moves downwardly in Fig. 4, pivoting arm 148 counterclockwise about the fixed pivot 150. Accordingly, the pivot 154 moves counterclockwise about pivot 150, and the sea level master pivot SLMP in Fig. 4 is moved downwardly.

When the engine speed lever 120 of Fig. 6 is moved to the rear to produce a lower assumed engine speed, it will be appreciated that the just described parts will be moved in the opposite directions from those just specified.

Reference is now made to Fig. 5, wherein the arm 148, pivot 150, pivot 154, arm 156 and sea level master pivot SLMP are also schematically shown. Bearing in mind the immediately preceding description of the actual structure as disclosed in Figs. 4 and 6, it will be appreciated that the position of the engine speed lever 120 determines the position of arm 148 about the fixed pivot 150, and consequently determines the position of the pivot 154 along the arc 153. The position of pivot 154 in turn determines above which of the constant R. P. M. lines the sea level master pivot SLMP is positioned.

Accordingly, when the engine speed lever 120 is positioned in the 1600 R. P. M. position, the described arrangement places pivot 154 in the 1600 R. P. M. position above arc 153, and the sea level master pivot SLMP will be placed above the 1600 arc. Similarly, when the engine speed lever 120 is in the 1800, 2000, 2200 or any intermediate position, pivot 154 is properly positioned along arc 153, and the sea level master pivot SLMP is properly above the 1800, 2000 or 2200 arc, or properly in an intermediate position, as the case may be. Means will now be disclosed for properly positioning the sea level master pivot SLMP along the selected R. P. M. arc in accordance with the instant position of the simulated throttle lever.

Reference is again made to Fig. 6 where the simulated throttle lever in fuselage 12 is designated by 160. This lever is pivotally mounted upon fixed stud 122, and integral therewith is the arm 162, to the rear end of which is affixed the upper end of link 164. The lower end of link 164 is pivotally attached to one arm of bell crank 165 which is pivoted upon stud 166, and the forward end of link 190 is pivotally attached to the other arm of bell crank 165.

In Fig. 4 it will be seen that the rear end of link 190 is pivotally attached to the outer end of arm 192, the other end of which is affixed upon the upper end of shaft 196 by means of set screw 194. The lower end of shaft 196 is rotatably mounted in bracket 197 which is affixed to the fixed plate 139 by means of screws 198. A gear sector 200 is provided, and it has an integral boss 202 which is affixed upon shaft 196 by screw 204. The teeth 206 of sector 200 mesh with gear 208 to drive the same, gear 208 being affixed upon shaft 210 which has its lower end rotatably held by bearing 212 which is affixed to plate 139 by screws 214. Affixed upon the upper end of shaft 210 is the inner end of arm 216, to the outer end of which is pivotally attached one end of arm 218, stud 220 pivotally connecting the arms 216 and 218. The other end of arm 218 connects with stud 158, the vertical axis of which positions the sea level master pivot SLMP.

Considering Figs. 4, 5 and 6, when the throttle lever 160 is moved ahead to simulate the opening of the throttle in a real plane, arm 162 and link 164 move upwardly, rotating bell crank 165 counterclockwise and moving link 190 to the rear. The rearward movement of link 190 results in a counterclockwise rotation of arm 192, shaft 196 and sector 200, as seen from above, and in a clockwise rotation of gear 208, shaft 210 and arm 216, also as seen from above. The rotation of arm 216 will result in an upward movement of link 218, and the sea level master pivot SLMP will be moved clockwise in an arc about pivot 154, because link 156 prevents the sea level master pivot SLMP from moving in any other path. It will be recalled that the location of pivot 154 is determined by the setting of the engine speed lever 120 so that the sea level master pivot SLMP is at all times properly placed above one of the engine speed lines of Fig. 6, or intermediate the engine speed lines, according to the instant assumed engine speed.

It will be appreciated that when the throttle lever 160 is moved to the rear, to simulate the closing of the throttle in a real plane, the sea level master pivot SLMP will be rotated counterclockwise in Figs. 5 and 6 about the pivot 154.

Briefly, therefore, the setting of the engine speed lever determines the position of pivot 154, and accordingly, along or near which of the R. P. M. lines in Fig. 6 the sea level master pivot SLMP shall move. Then, the position of the throttle lever determines at which point lengthwise of the selected R. P. M. line, or lengthwise near the selected R. P. M. line, the sea level master pivot SLMP shall be positioned. As previously stated, when the engine speed lever is in the 1600, 1800, 2000, or 2200 position, or at some intermediate value, the sea level master pivot will be properly positioned with respect to the R. P. M. lines. Also, when the throttle lever is in the full throttle position, the pivot 220 is positioned as shown in Fig. 5 so that the master sea level pivot SLMP must be positioned along the full throttle line of Fig. 5. When the throttle lever is in the three-quarter position, pivot 220 will be at the point ¾T in Fig. 5 so that the sea level master pivot will be along the three-quarters throttle line of Fig. 6, and when the throttle lever is in the one-half position, the pivot 220 will be at the point indicated in Fig. 5 by ½T, so that the sea level master pivot SLMP will be along the one-half throttle line. For points other than the full, three-quarters and one-half setting of the throttle lever, the pivot 220 will be properly positioned to place the sea level master pivot SLMP relative to the three basic throttle lines of Fig. 5.

Accordingly, the disclosed structure provides means for placing the sea level master pivot in the proper position relative to the manifold pressure and horsepower arcs in Fig. 5 to indicate the manifold pressure and horepower that is theoretically being produced in accordance with the instant combined positions of the engine speed lever and throttle control. The two factors of engine speed and throttle setting determine the factors of manifold pressure and horsepower when altitude is zero. Accordingly, the sea level master pivot is always positioned in accordance with the factor of sea level manifold pressure.

Means for causing the altitude master pivot AMP to follow the sea level master pivot SLMP exactly when altitude is assumed to be zero, and means for properly displacing the altitude master pivot AMP from the sea level master pivot SLMP according to the factor of assumed altitude will now be disclosed, so that the altitude master pivot AMP is properly positioned at all times in accordance with the three independent variables of throttle lever setting, engine speed lever setting, and assumed altitude. Then, as previously made clear, the manifold pressure arm MPA and horsepower arm HPA will be properly positioned about the fixed master pivot FMP for the instant assumed manifold pressure and horsepower.

Figure 7:
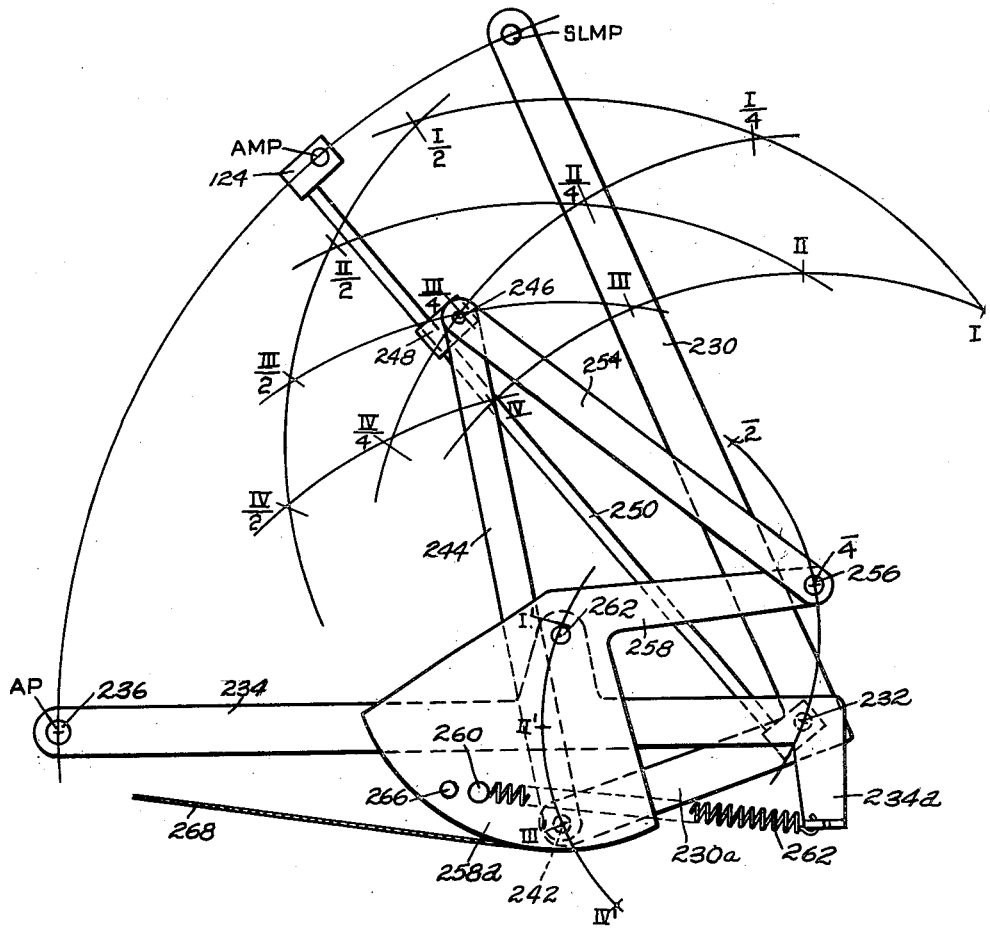
Fig. 7 is a view of a portion of the engine computer, and more particularly the portion thereof operated in response to changes in assumed altitude.

Reference is now made to Figs. 4 and 7 where the sea level master pivot SLMP is shown. The resultant position of this pivot determines the position of one end of arm 230 which is pivoted about the stud 232 carried by arm 234 which in turn is pivoted about the axis of stud 236 carried by member 238 which is affixed to plate 139 by screws 240. The axis of stud 236 forms the anchor pivot AP. Integral with the arm 230 is the shorter arm 230a, and pivotally attached to the outer end of arm 230a, by means of stud 242, is one end of link 244, the other end of which is pivoted to stud 246 carried by block 248 which slides upon rod 250. One end of rod 250 is carried by block 124 which, as previously described, is carried by stud 122 which forms the altitude master pivot AMP.

Stud 246 also carries spacer 252, and above this spacer is pivotally connected one end of link 254, the other end of which is pivotally connected to stud 256 carried by one end of arm 258 which is integral with sector 258a. Sector 258a carries a stud 260 to which is anchored one end of spring 262, the other end of which is anchored to arm 234a integral with arm 234. The crank formed by arm 258 and sector 258a is pivoted upon stud 264 carried by arm 232. A stud 266 is carried by the lower side of sector 258a to engage the arm 234 under predetermined conditions to be later described.

Cable 268 has one end connected to sector 258a, and this cable travels on pulley 270 which is rotatably mounted upon the upper end of member 272, by means of stud 274, member 272 being affixed to plate 139 by means of screws 276.

For present purposes it is sufficient to explain that the cable 268 is moved by an altitude unit to be later described so as to always be positioned in accordance with the instant assumed altitude of the trainer. As assumed altitude is increased, the unit to be described releases cable 268 by an amount linearly proportional to the change in assumed altitude, and spring 262 keeps cable 268 tight and at the same time rotates sector 258a and arm 258 counterclockwise as seen from above through an angle dependent upon the change in assumed altitude. On the other hand, when assumed altitude is decreased, the altitude unit pulls cable 268 to the right linearly proportional to the decrease in assumed altitude, and sector 258a and arm 258 are rotated clockwise about pivot 264 through a proportionate angle.

The distance from the sea level master pivot SLMP to the pivot 232, the distance from the altitude master pivot AMP to the pivot 232, and the distance from the anchor pivot AP to the pivot 232 are all equal. Therefore, the altitude master pivot AMP must at all times be directly over the sea level master pivot SLMP or at some point on an arc passing through the sea level master pivot SLMP and the anchor pivot AP, which arc has its center at the common pivot 232. The anchor pivot AP is positioned at the zero horsepower-zero manifold pressure point, as clearly shown in Fig. 5. By displacing the altitude master pivot AMP from the sea level master pivot SLMP toward the anchor pivot AP by an amount equal to the loss of manifold pressure and horsepower for the assumed altitude, the altitude master pivot AMP will be properly positioned in accordance with the three input variables of throttle setting, engine speed and altitude, and the manifold pressure arm MPA and horsepower arm HPA will be properly angularly positioned about the fixed master pivot FMP according to instant assumed manifold pressure and assumed horsepower available. For example, when the sea level master pivot SLMP is positioned at the 2200 R. P. M., full throttle position, and assumed altitude is zero, by positioning the altitude master pivot AMP over the sea level master pivot SLMP, both the sea level master pivot and the altitude master pivot will be in the 37 inches manifold pressure and 515 horsepower position. The manifold pressure arm MPA and horsepower arm HPA will be properly positioned.

Under the same circumstances, except altitude assumed to be 5,000 feet, by reference to Fig. 2 it will be seen that a horsepower of 440 and a manifold pressure of 30.6 inches is produced. This point is plotted on Fig. 5 and labelled "5000." Corresponding values for altitudes of 10,000 feet, 15,000 feet and 20,000 feet are ascertained by inspection of Fig. 2, and the corresponding points in Fig. 5 are labelled "10,000," "15,000" and "20,000." It is apparent that thereafter if when assumed altitude is 5000 feet and the throttle is in the full position and the engine speed lever is set for 2200 R. P. M., the altitude master pivot AMP is positioned above the point "5000" in Fig. 5, the manifold pressure arm MPA and horsepower arm HPA will be properly positioned to account for the loss of manifold pressure and horsepower occasioned by assumed altitude. Corresponding positioning of the altitude master pivot AMP for altitudes of 10,000, 15,000 and 20,000 feet will produce similar results.

The displacement of the altitude master pivot from the sea level master pivot along an arc between the sea level master pivot and the anchor pivot according to the instant assumed altitude by an amount depending upon the decrease of manifold pressure and horsepower as a result of the factor of assumed altitude is accomplished by the apparatus disclosed in Fig. 7 which was laid out as follows:

The common pivot 232 was selected, and the lengths of arms 230, 250 and 234 made equal, these lengths being of the required length to locate the pivot 232 at the center of the arc passing through the anchor pivot, the sea level-full throttle position of the sea level master pivot, and the required positions of the altitude master pivot when altitude is 5,000 feet, 10,000 feet, 15,000 feet and 20,000 feet, the throttle lever is in the full position and the engine speed lever is set for 2200 R. P. M. The arc in question is designated "AMP/arc" in Fig. 5.

The sea level master pivot was positioned along the AMP arc in four different positions, and the corresponding positions of arm 230 were designated I, II, III and IV. At the same time the corresponding positions of pivot 242 were designated I', II', III' and IV'. The required position for arm 250 corresponding to each of the four basic positions of arm 230 to halve the angular distance between the sea level master pivot SLMP and the anchor pivot AP were then found and marked $$\frac{I}{2}, \frac{II}{2}, \frac{III}{2}, \text{ and } \frac{IV}{2}$$

and the required position for arm 250 corresponding to each of the four basic positions of arm 230 to quarter the angular distance between the sea level master pivot SLMP and the anchor pivot AP were also found, and these positions were designated $$\frac{I}{4}, \frac{II}{4}, \frac{III}{4}, \text{ and } \frac{IV}{4}$$

The altitude master pivot AMP was placed over the sea level master pivot SLMP, or in the assumed zero altitude position, and the length of links 244 and 254 were selected so pivot 256 overlies pivot 232 and so that link 254 lies parallel to rod 250. The altitude master pivot AMP is then the sea level master pivot SLMP and stop 266 engages the top of arm 234.

With a compass set to the length of link 244, arcs were successively struck from the points I', II', III' and IV'. The arc drawn from the point I' passes through or very near to the points $$I, \frac{I}{4} \text{ and } \frac{I}{2}$$

the arc drawn from the point II' passes through the points $$II, \frac{II}{4} \text{ and } \frac{II}{2}, \text{ etc.}$$

Accordingly, the numerator of each fraction denotes the basic position of the sea level master pivot SLMP along the AMP arc, and the denominator of each fraction denotes the proportion of the angular distance from the sea level master pivot SLMP to the anchor pivot AP in which the altitude master pivot AMP is to be placed for the two selected altitudes when altitude is decreased by one-quarter and one-half. For example, the fraction $$\frac{III}{4}$$

indicates the position of the pivot 246 when arm 230 is in the III position and the altitude master pivot AMP is to be one-quarter of the angular distance from the sea level master pivot SLMP to the anchor pivot AP. The linkage is shown in this position in Fig. 7.

Next, with a compass set to the length of link 254, the point was found from which an arc with this radius could be struck through the above mentioned intersections labelled with fractions of the same denominator, or as close thereto as possible. The points are designated $\overline{2}$ and $\overline{4}$. Pivot 262 was then located at the center of an arc through stud 232, point $\overline{4}$ and $\overline{2}$.

In view of the above construction, it will be appreciated that the sea level master pivot SLMP positions the arm 230 on one of the points I, II, III, or IV (to take the arbitrarily selected points only), and arm 230a positions pivot 242 at the corresponding point I', II', III' or IV'. The pivot 256 will be over pivot 232 when assumed altitude is zero. Accordingly, the pivot 246 will be above a line through pivot 232 and the sea level master pivot SLMP, and the altitude master pivot AMP will be over the sea level master pivot SLMP. The manifold pressure arm MPA and horsepower arm HPA will be positioned in the sea level manifold pressure and horsepower positions.

The apparatus is then arranged so that when the sea level master pivot SLMP is positioned in the full throttle 2200 R. P. M. position, with a sea level manifold pressure of 37 inches and a horsepower of 515, and assumed altitude is 9000 feet, the pivot 232 is over the point $\overline{4}$, and the altitude master pivot AMP will be displaced one-quarter of the distance from the sea level master pivot to the anchor pivot AP, or in the 26.5 inches of manifold pressure and 390 horsepower position.

By reference to Fig. 2 it will be noted that under the same assumed conditions a manifold pressure of 26.5 and a horsepower of 385 is produced.

Also, under the same assumed conditions, except with an altitude of 20,000 feet, the pivot 256 is moved by cable 268 so that it is over point $\overline{2}$, and the altitude master pivot AMP is displaced one-half of the distance from the sea level master pivot to the anchor pivot, or in the 17 inches of manifold pressure and 265 horsepower position. By reference to Fig. 2 it will be noted that under the same assumed conditions a manifold pressure of 17.2 inches and a horsepower of 265 are produced.

For any assumed altitude intermediate the basic illustrated points of sea level, nine thousand feet and twenty thousand feet, and any position of the sea level master pivot SLMP intermediate the I, II, III and IV positions or along any of the R. P. M. lines other than the 2200 R. P. M. line, the apparatus shown in Fig. 7 will properly displace the altitude master pivot AMP an angular distance along the arc between the sea level master pivot SLMP and the anchor pivot AP dependent upon the position of cable 268. Inasmuch as cable 268 is always positioned in accordance with the instant altitude, so will be pivot 256, and by means of links 244 and 254 the pivot 246 and altitude master pivot AMP will be displaced from the seat level master pivot SLMP by an angular distance dependent upon the instant assumed altitude. The altitude master pivot AMP will be positioned close to the proper position relative to the manifold pressure and horsepower arcs.

Accordingly, the altitude master pivot always positions the horsepower arm HPA and manifold pressure arm MPA about the fixed master pivot FMP in accordance with the factors of instant assumed manifold pressure and instant assumed horsepower output. These two factors are properly dependent upon the factors of throttle lever setting, engine speed and altitude.

In Fig. 4, the gear 119 is fixed to the spacer 110a which in turn is fixed to the manifold pressure arm MPA to rotate about the fixed master pivot FMP with arm MPA, and this gear drives gear 270 which is fixed upon the input shaft 272 of the manifold pressure selsyn motor transmitter designated generally by 274. The housing of this transmitter is numbered 276 and is carried by clamp 278 which in turn is supported by bracket 280 which is affixed to plate 139 by screws 272. The selsyn transmitter 274 is connected by electrical cable 284 with the manifold pressure selsyn receiver 286 which forms a part of the manifold pressure indicator designated generally by 288, and which is mounted upon the instrument panel 29 in fuselage 12, as shown in Fig. 1. The manifold pressure indicator 288 includes a dial 290 calibrated like the manifold pressure indicator in a real plane, and upon the output shaft 292 of selsyn receiver 286 is mounted needle 294 which moves over dial 290 to indicate to the student in fuselage 12 the instant assumed manifold pressure.

The disclosed arrangement of selsyn transmitter and receiver is well known to the art, and need not be further explained. It will be readily realized by those skilled in the art that the just disclosed arrangement will cause the needle 294 to be positioned relative to dial 290 in accordance with the position of the manifold pressure arm MPA about the fixed master pivot FMP. Accordingly, the manifold pressure indicator always indicates to the student in the trainer the instant assumed manifold pressure, computed as previously described by the engine computer disclosed in Fig. 4.

It will be appreciated by those skilled in the art that an instrument simulating the tachometer of a real plane may be regulated by the setting of the engine speed lever 120 to indicate to the student the instant assumed engine speed. Such an instrument may be mounted upon the instrument panel 29 of Fig. 1.

Referring again to Fig. 4, the link 300 has its lower end pivotally connected to the horsepower arm HPA as shown, and therefore the position of this link is a measure of the instant assumed horsepower. Pivotally attached to the upper end of link 300 is the arm 302 which forms the input of the conventional follow-up motor or power amplifying assembly shown in box form and designated generally by 304. The output of this follow-up assembly is in the form of arm 306 affixed upon output shaft 307. Inasmuch as such motor follow-up assemblies are widely used in the art, it is unnecessary to explain the construction thereof. It is sufficient to merely state that the follow-up assembly always moves arm 306 through an angle equal to any angular movement of input arm 302, and in the same direction as any movement of arm 302.

Figure 8:
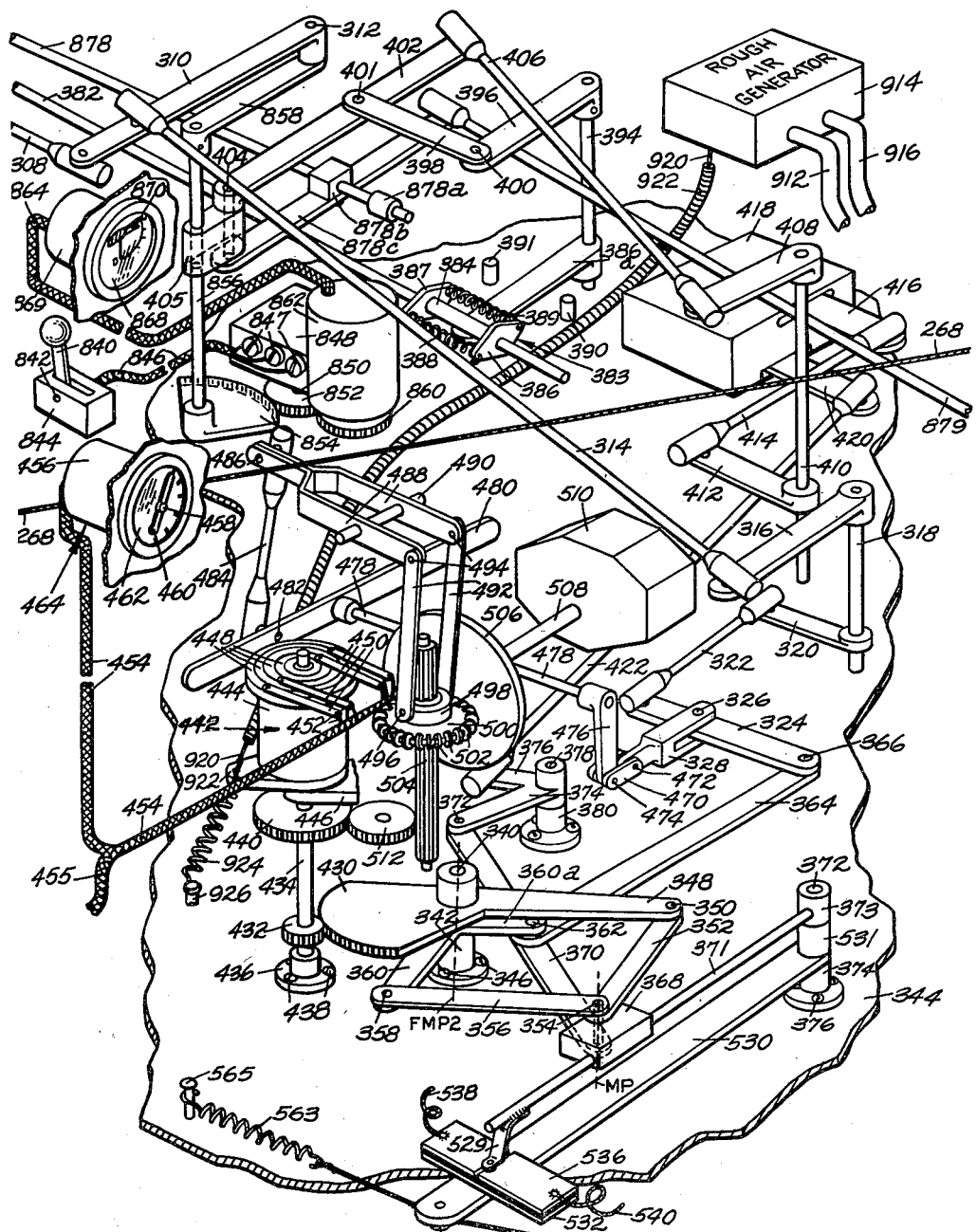
Fig. 8 is a general perspective view of the flight computer and associated apparatus.

Pivotally attached to arm 306 is the forward end of link 308, which as seen in Fig. 8 has its other end pivotally attached to the left end of walking beam 310 which is pivoted about stud 312 which, for present purposes, may be considered stationary. The forward end of link 314 is pivoted to walking beam 310, and the rear end of this link is pivotally attached to the outer end of arm 316, which together with shaft 318 and arm 320 form a bell-crank. Shaft 318 may be suitably supported by a bracket (not shown) fixed to any convenient fixed part inside fuselage 12. The right end of link 322 is pivotally attached to the outer end of arm 320, and the other end of this link is pivotally attached to the forward end of the horsepower walking beam 324 which is pivoted upon stud 326 held by yoke 328. The rear end of walking beam 324 is pivoted upon stud 366.

In view of the disclosed connection between the horsepower arm HPA and the horsepower walking beam 324, it will be appreciated that the forward end of the horsepower walking beam is always positioned in accordance with the instant assumed horsepower available as calculated by the engine computer of Fig. 4. An increase in horsepower available moves the left end of walking beam 324 and pivot 326 to the left, while a decrease in horsepower available moves the left end of the horsepower walking beam and pivot 326 in the opposite direction. The purpose of this positioning of the horsepower walking beam and pivot 326 will be later described.

*Flight computer*

Figure 9:
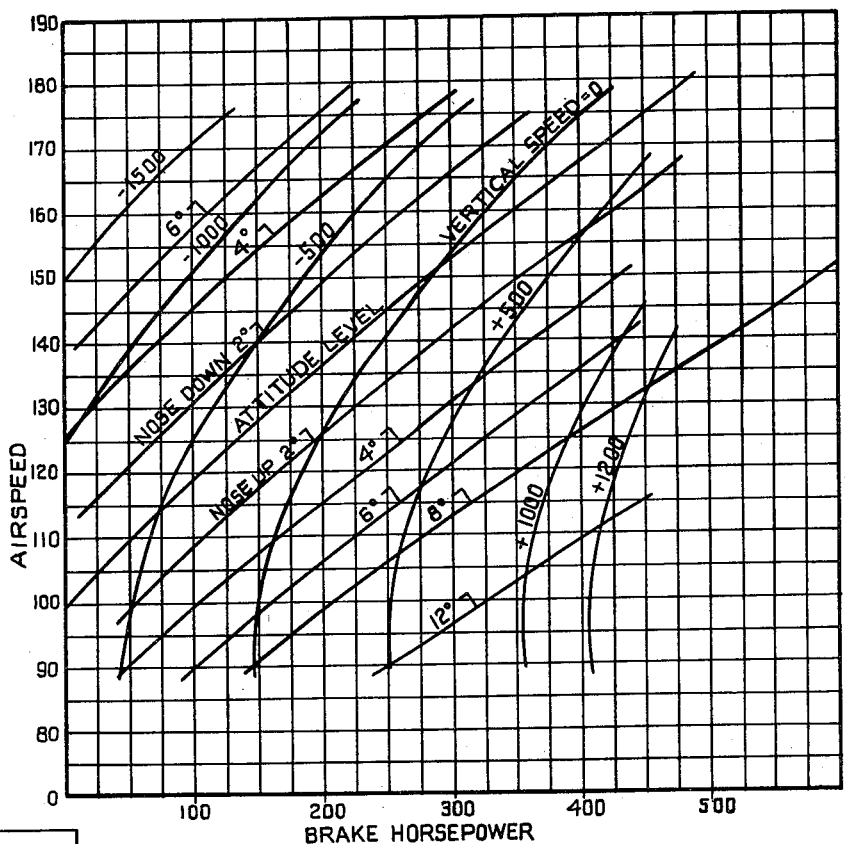
Fig. 9 is a graph showing the effect of power and attitude on air speed and vertical speed.

Reference is made to Fig. 9 which is a graph showing the effect of horsepower available and plane attitude on airspeed and vertical speed for a selected type of airplane. The factors of horsepower available and plane attitude are the independent variables, and these two variables determine the dependent variables of air speed and vertical speed. For example, in level flight seventy-five horsepower will produce an airspeed of 114 miles per hour with a positive vertical speed of 500 feet per minute; a nosing up of the plane of two degrees and 200 horsepower will produce a zero vertical speed and an air speed of 125 miles per hour. An attitude of six degrees climb and 350 horsepower will produce a positive vertical speed of about 750 feet per minute and an air speed of about 128 miles per hour.

In Fig. 9, if any two of the variables are known, the other two may be ascertained by inspection. For instance, if it is known that the airplane is flying at 160 miles per hour and descending 500 feet per minute, the airplane must be nosed down close to 3 degrees and is flying with 225 horsepower. Accordingly, this graph shows the horsepower required to maintain any selected set of flight conditions.

Figure 10:
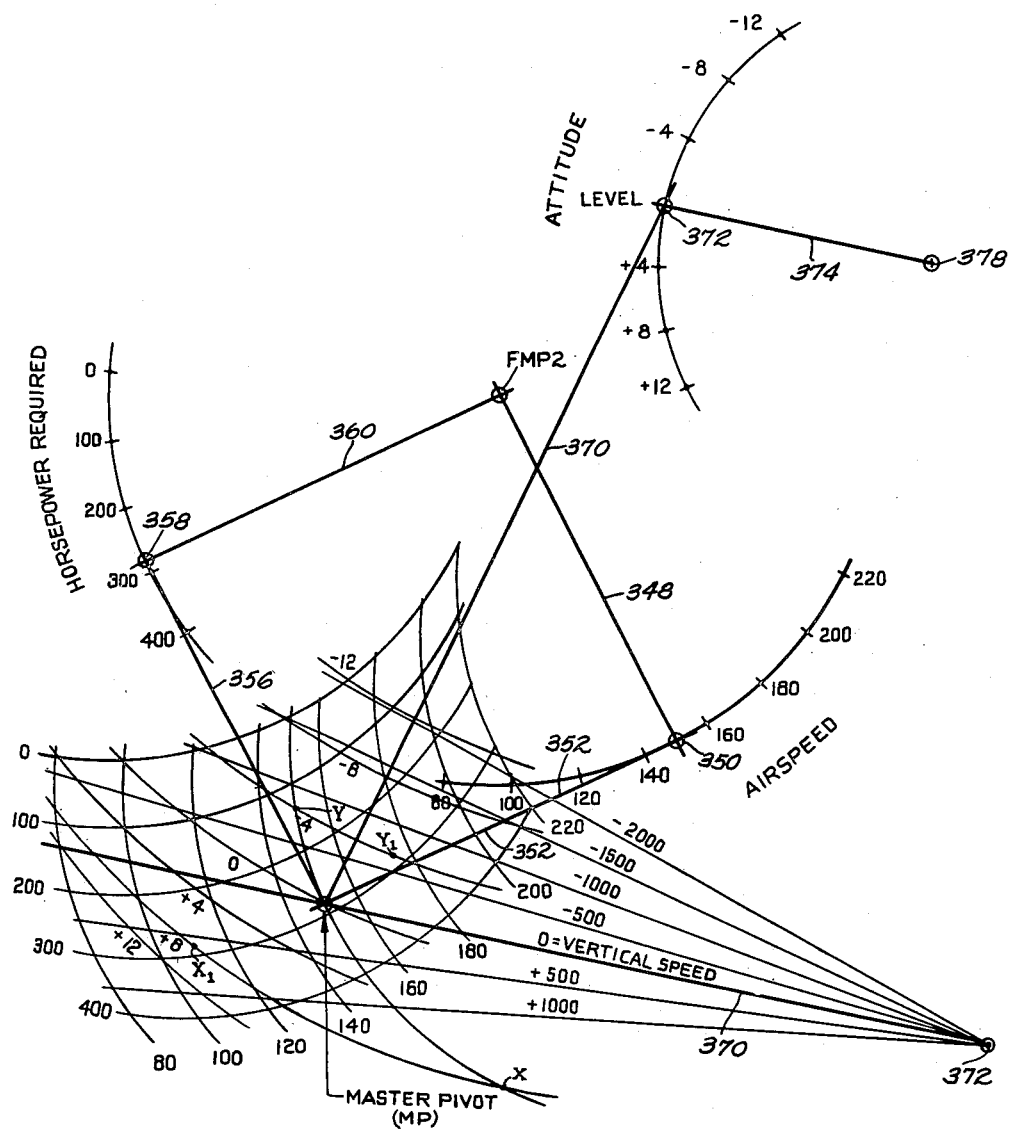
Fig. 10 is a view showing the information contained in Fig. 9 replotted in a form suitable for the design of a computer, as well as schematically showing certain of the parts of the flight computer.

Reference is now made to Fig. 10 where the information shown in the graph of Fig. 9 is replotted in a form which lends itself to the design of a satisfactory computer. By comparison of the graphs of Figs. 9 and 10, it will be seen that the air speed lines, horsepower required lines, attitude lines and vertical speed lines of both graphs bear the same relative positions and values.

The linkage schematically shown in Fig. 10 and actually shown in Fig. 8, to both of which reference is made, follows much the same pattern as that previously disclosed in connection with the engine computer. A fixed master pivot FMP2 is provided, this pivot being the stud 340 integral with the member 342 which is affixed to plate 344 by means of screws 346. Pivoted upon the fixed master pivot FMP2 is one end of the arm 348, the other end of which is pivotally connected by stud 350 to the upper end of link 352. The lower end of link 352 is pivoted upon stud 354, the vertical axis of which forms the master pivot MP. Also pivoted upon stud 354 is the right end of link 356, the left end of which is pivoted upon stud 358, and the lower end of arm 360 is also pivoted upon this stud. The upper end of arm 360 is pivoted upon stud 340 which is the fixed master pivot FMP2.

Arm 360a is integral with arm 360, and the outer end of arm 360a carries stud 362 to which is pivotally connected the left end of arm 364, the other end of which is pivoted to stud 366 carried by the right end of the horsepower walking beam 324.

The stud 354 which forms the master pivot MP also carries block 368 which is slidably mounted upon rod 371 carried by bushing 373 which is rotatably mounted upon stud 372 which in turn is held by bearing 374 which is affixed by screws 376 to plate 344.

Also carried by stud 354 which forms the master pivot MP is the lower end of link 370, the upper end of which is pivotally connected by stud 372 to arm 374 which with arm 376 forms a bell crank pivoted upon stud 378 integral with bracket 380 which is affixed to plate 344 by means of screws 382.

The flight computer of Fig. 8 was determined as schematically shown in Fig. 10. A radius equal to the desired length of arm 374 was selected, and the altitude arc in the upper right of Fig. 15 was drawn. This arc was divided in increments of changes of four degrees of fuselage attitude, viz., −12, −8, −4, level, +4, +8 and +12. A radius equal to the desired length of link 370 was selected, and from each of the selected points on the attitude arc an arc was drawn. These arcs were labelled −12, −8, −4, 0, +4, +8 and +12. The outer end of this last radius coincides with the master pivot MP, and consequently, when the fuselage is in the −4 degree attitude, the master pivot MP will be at some point along the —4 degree attitude arc. From the fixed master pivot FMP2 the air speed arc having a radius equal to the desired length of arm 348 was drawn, and this arc was divided into increments of 20 miles per hour of air speed, viz., 80, 100, 120, 140, 160, 180, 200 and 220. From each of the selected division marks on the air speed arc, using a radius equal to the desired length of link 352, the air speed arcs were drawn and labelled. Then using a radius equal to the desired length of arm 360, the horsepower required arc in the upper left of Fig. 10 was drawn, and this arc was divided into increments of 100 horsepower, viz., 0, 100, 200, 300 and 400. With a radius equal to the desired length of link 356, from each of the division marks of the horsepower arc, an arc was drawn generally at right angles to the air speed arcs. These arcs were properly labelled. The vertical speed lines were properly drawn in relative to the previously drawn three sets of arcs. By joining the outer ends of links 370, 352 and 356 to form the master pivot MP, and by sliding the master pivot MP on rod 371, whenever the master pivot MP is properly positioned on the graph in accordance with any two factors of air speed, vertical speed, horsepower required or attitude, the other two factors may be determined from the graph by noting the position of the master pivot MP.

The bell crank arms 374 and 376 and link 378 are responsive to the pitching and climbing of fuselage 12 in the following manner:

Referring to Fig. 4 there is disclosed an arm 380 which passes through the hole 380a in the bottom 12a of the fuselage 12. This arm is operated by the pitching and diving movements of fuselage 12 in a manner well known to those skilled in the art, and the pitching and diving movements in turn depend on the fore and aft movements of the control wheel in fuselage 12. For a detailed disclosure of one manner in which arm 380 may be moved in response to motions of fuselage 12 about its transverse axis, reference may be made to U. S. Patent 2,485,292 dated October 18, 1949, and granted on an application of Karl A. Kail for Aviation Trainer. For the purposes of this application it is sufficient to know that arm 380 moves to the rear of the fuselage or to the right in Fig. 4 in response to a raising of the nose of the fuselage, and in the opposite direction in response to the lowering of the nose of the fuselage.

Figure 13:
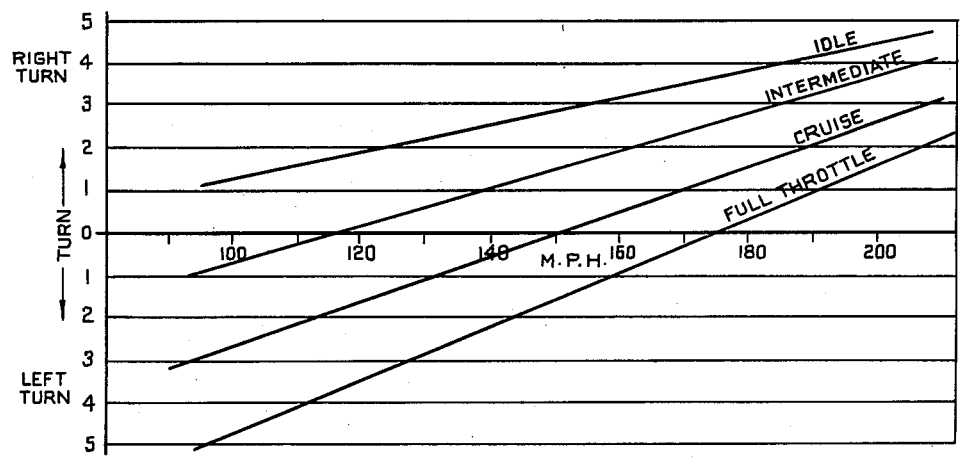
Fig. 13 is a graph showing the effects of air speed and throttle setting upon rate of turn.

Pivotally attached to arm 380 is the forward end of link 382, the rear end of which, as shown in Fig. 13, carries the spring connecting assembly designated generally by 383. This spring assembly is shown in detail in Fig. 11, and includes an inner sleeve 384 affixed upon rod 382 and slidably held inside the outer sleeve 384 which carries stud 385 connected to arm 386. A pair of end plates 386 and 387 are included, and springs 388 and 389 have their ends connected to the end plates. When link 382 is moved to the rear, sleeve 384 moves therewith, pushing end plate 386. By means of springs 388 and 389, the end plate 387 moves to the rear, as does stud 385 and the outer end of arm 386. However, when arm 386 reaches stop 390, the spring assembly allows rod 382 to move farther to the rear, even though the travel of arm 386 is limited. The action of the spring connecting assembly 383 to cause arm 386 to move in the opposite direction when link 382 moves ahead will be understood without a detailed explanation. Stop 391 is provided to limit the movement of arm 382 in the counterclockwise direction.

The inner end of arm 386 is affixed upon shaft 394, and affixed upon the upper end of shaft 394 is one end of arm 396, the other end of which pivotally carries the rear end of link 398 by means of stud 400. The forward end of link 398 is pivotally connected by stud 401 to walking beam 402, the left end of which is pivoted upon stud 404 carried by block 405. This block may for present purposes be considered stationary. Pivotally attached to the other end of walking beam 402 is the forward end of link 406, the rear end of which is pivotally attached to the outer end of arm 408 which, together with shaft 410 and arm 412 forms a bell crank. To the outer end of arm 412 is pivotally attached the left end of link 414, the other end of which is pivotally attached to the outer end of arm 416 which forms the input of a conventional type follow-up motor assembly, shown in block form and numbered 418. The output arm of the follow-up motor assembly is designated 420. For the purposes of this disclosure it is sufficient to know that the follow-up assembly 418 merely causes the output arm 420 to move through the same angle and in the same direction as the input arm 416. Pivotally attached to the outer end of arm 420 is one end of link 422, the other end of which is pivotally connected to the previously described arm 376.

In view of the just described arrangement interconnecting the arm 380 in Fig. 4 with the bell crank arm 376 in Fig. 8, it will be appreciated that the position of the bell crank arms 376 and 374 and of the stud 372 about the axis of pin 378 is at all times dependent upon the climbing and diving attitude of the fuselage 12. The higher the nose of the fuselage, the farther counterclockwise stud 372 is positioned. The position of stud 372 is a true measure at all times of the attitude of fuselage 12 about its transverse axis.

As the attitude of fuselage 12 about its transverse axis changes, the position of pivot 372 similarly moves, and by means of link 370 the master pivot MP is properly moved relative to the attitude lines of Fig. 10, so that the master pivot MP is always positioned relative to the attitude lines according to the instant position of fuselage 12 about its transverse axis.

Also, as the horsepower available changes, the position of the horsepower walking beam 324 about the pivot 366 changes, as does the position of stud 326, so that this stud is positioned, in the one instance, by the horsepower available as determined by the engine computer.

In Fig. 8 it will be seen that integral with the arm 348 is the sector 430, the teeth of which mesh with the gear 432 fixed upon vertical shaft 434 which is rotatably supported by the bearing 436 affixed by screws 438 upon the plate 344. Also fixed upon shaft 434 is the gear 440. It will be seen that the shaft 434 forms the input or rotor of the air speed transmitting Selsyn motor designated generally by 442, and that the housing 444 of this motor is numbered 444, housing 444 being suitably rotatably mounted within the bracket 446, and this bracket may be affixed to the plate 344. Affixed upon the upper end of housing 444 are a plurality of slip rings 448, each of which slip rings is electrically insulated from the others and each of which is connected in a manner well known to those skilled in the art to the various coils within the Selsyn motor 442. A plurality of brushes 450 are provided, each of these brushes being arranged to bear against a different one of the slip rings 448, and connected to each of the brushes 450 is one of a plurality of wires 452 which form cable 454. The cable 454 connects with the airspeed receiving Selsyn motor 456 upon the output shaft 458 of which is mounted a needle 460 arranged to move over the dial 462 which is calibrated like the airspeed indicator in a real plane.

By virtue of the electrical connection between transmitter 446 and receiver 456, the indicating needle 460 will always be positioned relative to the dial 462 in accordance with the position of shaft 434. The airspeed indicator including receiver 456, shaft 458, needle 460 and dial 462 is designated generally by 464, and by reference to Fig. 1 it will be seen that this indicator is mounted upon the instrument panel 29 within fuselage 12. By reference to the airspeed indicator 464, the student in the trainer will always have indicated to him the instant assumed airspeed.

Also in Fig. 8, it will be recalled that the yoke 328 supports the horsepower walking beam 324 by means of stud 326. Affixed to the left end of yoke 328 is the linkage 470 pivoted at points 472 and 474. The lower end of arm 476 is pivotally attached to the left end of links 470, and the upper end of this arm is affixed upon the horizontal shaft 478. Affixed upon the forward end of shaft 478 is the lever 480, and pivoted to lever 480 by means of stud 482 is the lower end of link 484. The upper end of link 484 is pivoted by stud 486 to the left end of yoke 488, which yoke is pivoted upon the fixed rod 490 which may be suitably supported by a fixed bracket (not shown). Pivoted to the right end of each of the arms 488 is a vertical link 492 held by means of pivots 494. The lower end of each of the links 492 is pivoted by means of pivots 496 (only one shown) to the hub 498 of a driven friction disc 500 having a periphery including a plurality of metallic rings 502. The driven wheel 498 is mounted upon a vertical splined shaft 504 which may be supported by a suitable bracket (not shown). The metallic rings 502 of the driven wheel 500 are arranged to bear against the face of disc 506, the face of which is in a vertical plane and preferably comprises a suitable rubber friction surface. Disc 506 is carried by the horizontal shaft 508 driven by the constant speed motor 510. This motor may be arranged to be energized whenever the trainer is in operation, and therefore may conveniently be energized upon a turning on of the "ignition" switch in the fuselage 12. This switch, being well known to those skilled in the art, is not disclosed herein.

The splined shaft 504 also drives the spur gear 512 which may be mounted upon a suitable vertical rod, and gear 512 drives the gear 440 which is affixed upon the vertical shaft 434 which forms the input shaft of the airspeed transmitting Selsyn motor 446.

Having described the structural arrangement of the flight computer of this invention, reference is made to Fig. 9 for a discussion of the basic variables involved in actual flight. If it is assumed that the airplane is cruising in level flight at 150 miles per hour, using 285 horsepower, if the pilot suddenly noses the plane up to an attitude of 8 degrees, it is apparent that the conditions of flight that the plane will experience are not found along the constant horsepower line of 285 horsepower. The ultimate condition, however, is found at 285 horsepower at 8 degrees of nose-up, under which condition it is apparent that the plane will be flying at 111 miles an hour with a 600 foot a minute rate of climb. What actually occurs is that a comparatively large rate of climb is established initially, which rate of climb gradually diminishes to 600 feet a minute as the airspeed falls off to 111 miles an hour. This transitional period can be found in Fig. 14 by following the 150 miles an hour airspeed line over to the 8 degree nose-up line, since airspeed does not fall off appreciably during the short length of time in which it takes the plane to change from level flight to an attitude of 8 degrees up. It will be seen that for the airplane to fly at an airspeed of 150 miles per hour with its nose raised 8 degrees, a horsepower of approximately 565 would be required, and that the vertical speed would be approximately 1500 feet per minute. Inasmuch as the plane is actually flying with only 285 available horsepower, and the attitude of the plane is kept in the 8 degree nose-up position, by following the 8 degree line downward and to the left it will be noted that the rate of climb of the plane will gradually decrease and the airspeed of the plane will similarly gradually decrease until the plane reaches an airspeed of 111 miles an hour with a rate of climb of 600 feet per minute.

To simulate the just described effect of change in flight attitude, the flight computer of this invention, airspeed and attitude are employed as the inputs to the flight computer, and the computer determines vertical speed and the horsepower required for the particular conditions of flight. Horsepower required is compared with the horsepower available as determined by the engine computer and this difference determines the rate at which airspeed will change as well as the rate at which vertical speed will change. When airspeed and vertical speed have sufficiently changed so that the horsepower available equals the horsepower required, static flight will again be resumed.

Considering now the situation when the trainer is assumed to be flying in level flight (attitude 0) at an airspeed of 150 miles an hour and the horsepower available from the engine computer is equal to 285 horsepower, the available horsepower link 322 and the horsepower walking beam 324 will be positioned in a predetermined position, as will the link 324 and the bell crank including arms 360a and 360. The master pivot MP will be positioned in the 285 horsepower position, and the vertical speed rod 370 will be in the zero vertical speed position. The attitude linkage 370 will be positioned so that the master pivot MP is in the level attitude position, and the airspeed arm 348 will be positioned in the 150 miles an hour position. The apparatus is schematically so shown in Fig. 10. The driven disc 500 will be in the center of the driving disc 506, and therefore disc 500 will not be turning.

Assuming that the student in the trainer then pulls the control wheel 30 in fuselage 12 to the rear to raise the nose of fuselage 12 to the 8 degree climb position, and the student maintains the control wheel in the position required to maintain the fuselage in a climbing attitude of 8 degrees, the raising of the nose of the fuselage immediately moves the fuselage attitude input link 370 into a position along the 8 degree nose-up arc. The airspeed arm 348 does not immediately move, because it is held in position by the splined shaft 504, gears 512 and 440, shaft 434, gear 432, and sector 430. Accordingly, the master pivot does not move off the 150 airspeed line, but the master pivot MP does move to about the 565 horsepower position along the 8 degree nose up arc. The location of the master pivot MP is shown at X in Fig. 15. It will be seen that vertical speed will be momentarily 1500 feet per minute. Under these circumstances, the master pivot requires that there be a horsepower of 565 to keep the trainer moving at an airspeed of 150 miles per hour with its nose up 8 degrees. The link 356 is moved to the right, rotating the horsepower required arm 360 and arm 360a counterclockwise about the fixed master pivot FMP2. This rotation of the bellcrank including arms 360 and 360a forces link 364 to the right, and the right end of the horsepower walking beam 324 moves in the same direction. The horsepower walking beam 324 will pivot about the lower end of the horsepower available link 322, carrying the yoke 328, links 470 and the lower end of arm 476 to the right, resulting in a counterclockwise rotation of shaft 478, as seen from the rear. The left end of lever 480 will move downwardly, as will link 484 and the forward end of yoke 488. The links 492 will move upwardly, displacing the driven disc 500 upwardly from the center of disc 506. The driven disc 500 is rotated counterclockwise as seen from above, as is the splined shaft 504, and by virtue of the reversing gear 512 the gear 440, shaft 434 and gear 432 are all rotated counterclockwise as seen from above. The sector 430 will be rotated clockwise about the fixed master pivot FMP2, as will arm 348. Accordingly, the master pivot MP will be gradually moved along the 8 degree nose-up position in Fig. 11 into a lower airspeed position. The vertical speed rod 370 will at the same time also be moved into a lesser rate of climb position. As the airspeed decreases and the vertical speed decreases, the horsepower required arm 360 will be rotated clockwise about the fixed master pivot FMP2, as will the arm 360a, and the link 364 will be gradually moved to the left as the horsepower required becomes less and less; and as the horsepower required becomes less and less, the horsepower walking beam 324 will be moved back toward its original position, and through the intermediate linkage the driven disc 500 will be moved back towards the center of the driving disc 506. When the airspeed arm 348 has been returned to such a position that the horsepower required link 364 is in the same position that it occupied before the maneuver was begun, the horsepower walking beam 324 and pivot 326 will be in their original positions, the driven disc 500 will be in the center of the driving disc 506, and the apparatus will have again reached a static condition. However, it should be noted that inasmuch as the master pivot MP is now on the 8 degree nose-up position, it will not be along the 150 miles an hour airspeed position, nor will the vertical speed rod 371 be in the zero vertical speed position. The master pivot will be positioned in the 111 miles per hour position, and the vertical speed rod will be positioned in the 600 foot per minute climb position. The position of the master pivot is designated X1 in Fig. 10. The horsepower required arm 360 will be in the same position that it occupied before the maneuver was begun, viz., the 285 horsepower position.

It will be noted that during the maneuver in question the shaft 434 which forms the rotor of the airspeed transmitting Selsyn motor 442 will be rotated to properly change the indicated assumed airspeed given by the airspeed indicator 464 upon the instrument panel 29. Also, the vertical speed rod 370 will at first be moved into a very high vertical speed position, and as airspeed falls off the vertical speed rod progressively moves into a lower vertical speed position until it properly comes to rest in about the 600 foot per minute climb position.

It will be appreciated that in the event the trainer is in assumed level flight at 150 miles per hour with an available horsepower of 285, and the fuselage is placed in a nose-down position of 4 degrees, the assumed airspeed will increase and there will be a considerable downward vertical speed. Because the available horsepower of 285 is greater than the horsepower required to keep the plane 150 miles an hour with the nose down 4 degrees, by reference to Fig. 9 the ultimate assumed airspeed of the trainer may be found along the 4 degree nose-down line opposite the 285 horsepower position, and by inspection may be determined as being approximately 176 miles per hour and the vertical speed will be approximately a descent of 600 feet per minute. This ultimate condition will not be obtained instantly upon the nosing down of the fuselage, but the chain of events may be ascertained by moving along the 150 miles an hour airspeed line to the 4 degree nose-down line. It will be seen that initially the assumed rate of descent will be approximately 800 feet per minute, but that as airspeed increases by following the 4 degree nose-down line upward and to the right in Fig. 9, the rate of descent decreases as the airspeed picks up. Eventually the plane will be flying about 176 miles per hour with a rate of descent of 600 feet per minute.

The disclosed flight computer operates to accurately simulate this chain of events. When the trainer fuselage is put in the 4 degree nose-down position, the master pivot MP is moved by the link 370 from the zero attitude line to the 4 degree line. The vertical speed rod is moved into about the 750 foot nose down per minute negative vertical speed position. The master pivot MP will be positioned in the position designated Y in Fig. 10. The airspeed arm 348 is held stationary, as previously explained in the case where the nose of the fuselage was raised, and the horsepower required arm 360 is rotated clockwise as seen from above, pulling the link 364 to the left, and pivoting the horsepower walking beam 324 about the point at which it is attached to the link 322. The yoke 328, links 470, and the lower end of arm 476 move to the left, rotating shaft 478 and lever 480 clockwise as seen from the rear. Link 484 is moved upwardly, pivoting yoke 488, and the links 492 move downwardly, displacing the driven disc 500 from the center of the driving disc 506 in a downward direction. Consequently, the driven disc 500 is rotated clockwise as seen from above, as is the splined shaft 504, resulting in a counterclockwise rotation of gear 514 and in a clockwise rotation of gear 440, shaft 434 and gear 432. The airspeed sector 430 and arm 348 are rotated counterclockwise about the fixed master pivot FMP2 as seen from above, and the link 352 moves the master pivot MP along the 4 degree nose down arc to the right and into a higher airspeed position. At the same time, the vertical speed rod 371 is slowly moved counterclockwise into a lower rate of descent position. As the master pivot MP is so moved, the link 356 rotates the horsepower required arm 360 counterclockwise about the fixed master pivot FMP2 and the link 364 moves toward the upper right in Fig. 16—in the opposite direction from which it was initially moved when the nose of the fuselage was lowered. Accordingly, the horsepower walking beam 324 and pivot 326 are moved back toward their initial positions, tending to return the driven disc 500 to its neutral position. This process will continue until the master pivot MP is positioned at Y1 in Fig. 15 in the 176 miles per hour position along the 4 degree nose-up position, at which time the horsepower required arm 360 will have been returned to its neutral position, as will the link 364 and the horsepower walking beam 324. Accordingly the driven disc 500 will be replaced at the center of the driving disc 506.

During this transitional phase, the rotor 434 of the airspeed transmitting Selsyn motor 446 will be rotated clockwise as seen from above, and the indication given by the airspeed indicator 464 will show a gradual increase in airspeed until the final airspeed is reached.

Accordingly, the apparatus of this invention is properly operable to show an initially great rate of descent upon the nosing down of the trainer fuselage, followed by a gradual increase in airspeed and a slight dropping off of the rate of descent until the final airspeed and rate of descent are indicated.

It will be appreciated that the above two illustrations are typical only, and that the apparatus will actually function to indicate the correct amount of zoom and delay effect regardless of the initial assumed condition, and regardless of the amount of change of fuselage attitude.

Figure 11:
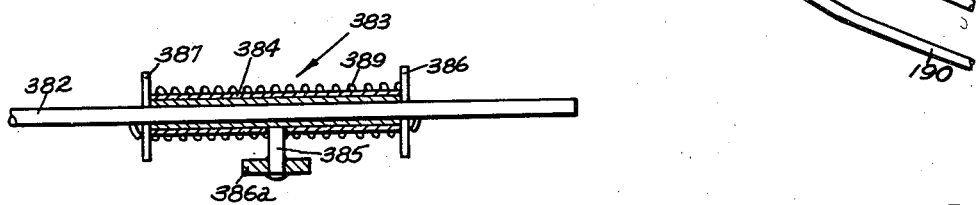
Fig. 11 is a view of the spring connecting assembly shown in Fig. 8.

A similar chain of events occurs when the attitude of the fuselage is held constant, and one or more of the inputs into the engine computer is changed so that a change in horsepower available results. In Fig. 11, assuming that link 322 is moved to the left as a result of an increase in assumed horsepower available, the horsepower walking beam 324 will pivot about the stud 366, moving yoke 328, links 470 and the lower end of arm 476 to the left. (Stud 366 becomes the pivot point because the airspeed arm 348 is held stationary by the spline 504, gear 512, gear 440, shaft 434, gear 432 and sector 430, and the stud 372 and link 370 are held stationary by the attitude of the fuselage. Accordingly, the master pivot MP does not move, and so the link 356, bellcrank arms 360 and 360a and link 364 remain stationary.) The movement of arm 476 results in a clockwise rotation of shaft 478, and the lever 480 is moved in the same direction, moving link 484 upwardly and the pivoting of the yoke arms 488 results in a downward movement of links 492 and a downward displacement of the driven wheel 500 from the center of the driving disc 506. The driven disc 500 is rotated clockwise as seen from above, as is spline 504, gear 512 is rotated in the opposite direction, while gear 440, shaft 434 and gear 432 are all rotated clockwise. Accordingly, a counterclockwise rotation of sector 430 and airspeed arm 348 result. Assuming that the trainer is in level flight, the pivot 372 positioned by the attitude of the fuselage about its transverse axis will be positioned as shown in Fig. 10, and the counterclockwise rotation of sector 430 and arm 348 will produce a gradual movement of the master pivot MP to the right along the zero attitude line. This movement will result in a pulling of link 356 in the same direction, and the horsepower required arm 360 and associated arm 360a will also be rotated counterclockwise about the fixed master pivot FMP2. Link 364 will be moved to the right, moving the stud 366 in the same direction, and at the same time carrying the yoke 328, link 470 and the lower end of arm 476 to the right—in the opposite direction from which they were moved when the horsepower available became greater. This movement of the lower end of arm 476 will move the driven disc 500 toward the center of the driving disc 506, by means of the interconnecting mechanism, so that when the stud 326 has been returned to its initial position, driven disc 500 will be centered with respect to the driving disc 506. At this instant the master pivot will have been positioned in the proper position insofar as assumed airspeed, assumed vertical speed and assumed horsepower required are concerned for the new horsepower output from the engine computer.

It will be appreciated that during the transitional stage the rotation of shaft 434 which is the input to the airspeed transmitting selsyn motor produces a proper gradual change in the indicated assumed airspeed given by instrument 464, and also that the vertical speed rod 370 is properly slowly pivoted about its pivot 372 in accordance with the gradual positive increase in assumed vertical speed.

When the link 322 in Fig. 8 moves in the opposite direction as a result of a decrease in the assumed horsepower available output, it will be appreciated that the horsepower walking beam 324 pivots clockwise about stud 366, that through the intermediate connecting apparatus the driven wheel 500 is moved from the center of driving disc 506 upwardly, that the driven wheel 500 is rotated counterclockwise as seen from above, and that the rotation of this wheel through the intermediate connecting apparatus rotates the airspeed arm 348 clockwise about the fixed master pivot FMP2, moving the master pivot MP along the zero attitude line into a lower assumed vertical speed and a lower assumed airspeed position. By means of link 356, the horsepower required arm 360 and its associated arm 360a are also rotated clockwise about the fixed master pivot FMP2, and link 364 moves to the left, moving stud 366 in the same direction, resulting in a movement of the pivot 326 in the opposite direction from which it was initially moved. Accordingly, the driven disc 500 will be moved downwardly toward the center of the driving disc 506, and this process will gradually continue for a length of time until the driven disc 500 is re-centered with respect to the driving disc 506. Upon the re-centering of the driven disc, the master pivot MP will have been positioned along the zero attitude line in the correct horsepower required position corresponding to the new available horsepower output from the engine computer. When that point is reached, the apparatus will again assume a static condition. During the transitional period, the input shaft 434 of the airspeed transmitter 464 will have been rotated to produce a gradual decrease in the indicated airspeed shown by indicator 464, and the vertical rod 371 will be gradually rotated counterclockwise about its pivot 372 toward the final lower assumed vertical speed position.

In view of the preceding disclosure, it will be appreciated that the master pivot MP is always properly positioned according to the attitude of the fuselage about its transverse axis, and that the master pivot is finally positioned in accordance with the instant horsepower available so that a proper indication of the instant assumed airspeed may be given, and so that the vertical speed pivot rod 371 is angularly positioned about its pivot 372 in accordance with the instant assumed airspeed. In order that the master pivot MP may be properly positioned in accordance with the instant available horsepower, the horsepower required for any flight condition is constantly compared with the horsepower available, and in the event of a difference a proper change in airspeed and vertical speed is produced so that the master pivot will be finally properly positioned to indicate the correct assumed airspeed and to properly position the vertical speed pivot rod 371.

*Means for producing the vertical speed indications*

Figure 12:
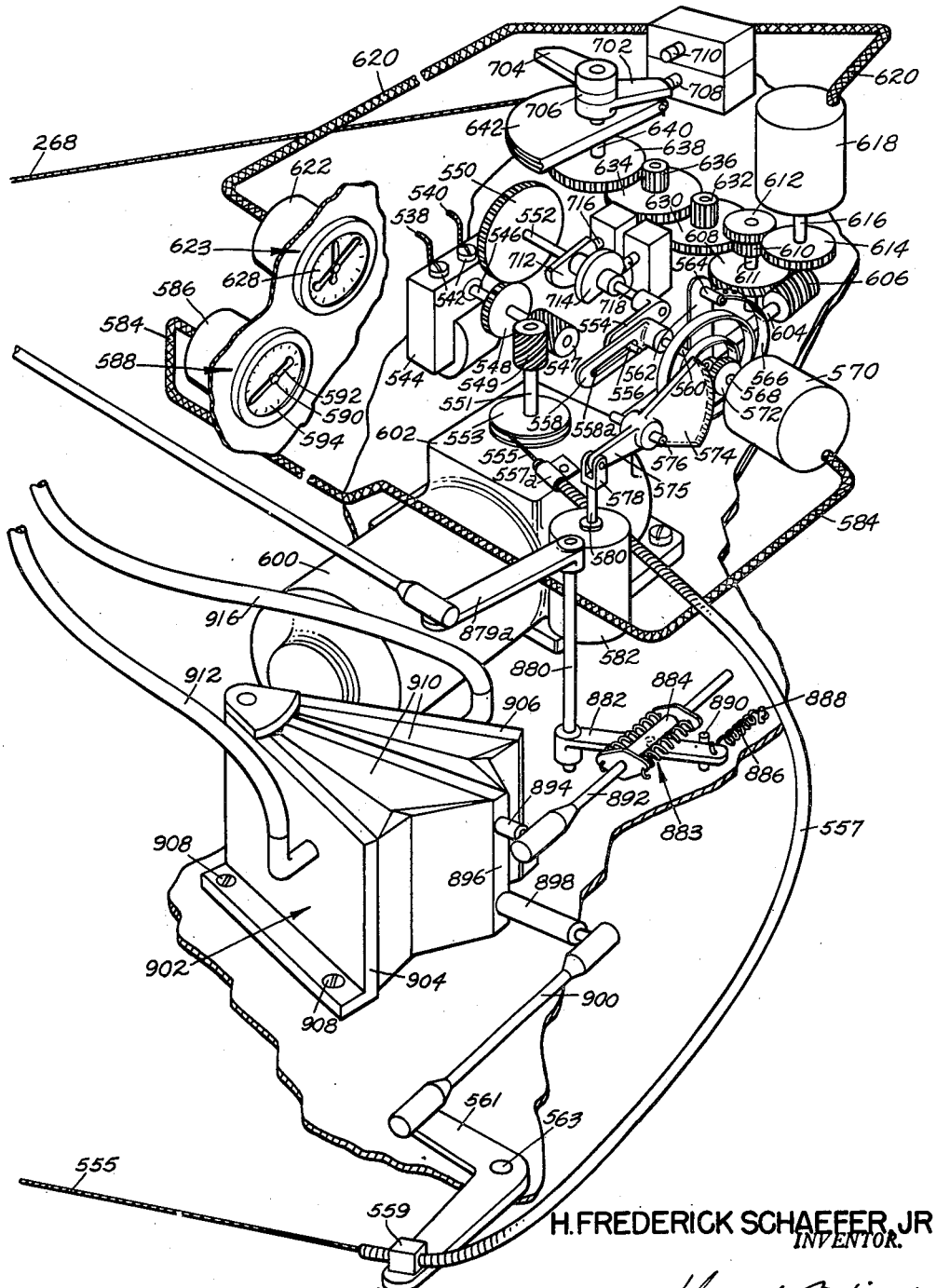
Fig. 12 shows the altitude computing apparatus and other associated parts.

Reference is now made to Fig. 8 where there is shown to be affixed upon the outer end of the vertical speed rod 371 an electrical contact 529. Rod 371 is grounded. An arm 530 is provided, this arm being pivoted upon the same stud 372 as the vertical speed arm 371, the hub 531 being integral with arm 530. Affixed upon the outer end of arm 530 is the insulating member 532, and affixed to this insulating member are the two mutually insulated contact strips 534 and 536. Contact strip 534 is connected by conductor 538 with one of the terminals 542 of the vertical speed follow-up motor 544, shown in Fig. 12 and contact strip 536 is connected by conductor 540 to the other terminal 542 of the vertical speed follow-up motor. In Fig. 12 it will be seen that the output shaft of the vertical speed follow-up motor is designated 546 and has upon its outer end a worm 547 which drives the worm 549 affixed upon the vertical shaft 551. Affixed upon shaft 551 is the pulley 553 upon which is anchored one end of the flexible cable 555. This cable passes through sheathing 557, the upper end of which is held in place by the clamp 657a carried by housing 602 and the lower end of which is held by block 559 affixed upon bellcrank 561 which is pivoted about the axis 563. Bellcrank 561 may, for present purposes, be considered a stationary element. The other end of the flexible cable 555, as seen in Fig. 3, is connected to one end of the tension spring 563, the other end of which is affixed to any suitable fixed member 565. Cable 555 is fixedly attached to the outer end of arm 530 by means of the clamp 561.

Whenever the contact 529 carried by the vertical speed pivot rod 371 engages both of the contact strips 534 and 536, both coils of the vertical speed follow-up motor 544 of Fig. 17 are grounded, and the motor is at rest. However, when rod 371 is rotated counterclockwise as seen from above in response to an algebraic increase in vertical speed, contact 529 becomes disengaged from contact strip 534, but remains in engagement with contact strip 536. The vertical speed motor 544 in Fig. 12 is energized, and the output shaft 546 thereof is rotated clockwise as seen in Fig. 12, resulting in a similar rotation of worm 547 and in a clockwise rotation of worm 549, shaft 551 and pulley 553 as seen from above. The flexible cable 555 is pulled by the rotation of pulley 553, and the outer end of arm 530 is moved in the counterclockwise direction as seen from above—in the same direction that rod 371 was moved initially. Accordingly, motor 544 will run until such time as arm 530 has been moved through the same angle as vertical speed pivot rod 371, at which time contact 529 will again come into engagement with contact strip 534, stopping motor 544.

On the other hand, when pivot rod 370 is rotated clockwise as seen from above, in response to an algebraic decrease in assumed vertical speed, contact 529 becomes disengaged from contact strip 536, but remains engaged with contact strip 534, resulting in an energization of the vertical speed motor 544 in the opposite direction, so that the output shaft 546, worm 547, worm 549, vertical shaft 551 and pulley 553 all rotate in the opposite direction from those just described. Inasmuch as pulley 553 is rotated counterclockwise, it releases flexible cable 555, and the tension of spring 557 in Fig. 8 will pull the outer end of arm 530 clockwise as seen from above—in the same direction that the vertical speed pivot rod 371 was moved when assumed vertical speed was algebraically decreased. Spring 557 will pull cable 555 until the vertical speed follow-up motor has released the cable sufficiently for arm 530 to move through the same angle as the vertical speed pivot rod 371 was initially moved. At that point the contact 529 will engage both of the contact strips 536 and 538, and the vertical speed follow-up motor will stop.

It will be appreciated that the direction of rotation and magnitude of angular rotation of shaft 546 which is the output shaft of vertical speed motor 544 will always depend upon the direction of rotation and magnitude of rotation of the vertical speed pivot rod 371. Accordingly, the output shaft 546 of vertical speed motor 544 is always angularly positioned from a predetermined neutral position by an amount dependent upon the magnitude of the assumed vertical speed, and is directionally positioned from the predetermined neutral position according to whether vertical speed is assumed to be positive or negative. Consequently, the position of shaft 546 at all times is a true measure of the assumed vertical speed.

In Fig. 12 it will be seen that there is affixed upon shaft 546 a spur gear 548 which drives the spur gear 550 mounted upon the left end of horizontal shaft 552. Upon the right end of shaft 552 is mounted the crank 554 carrying the offcenter pin 556 which passes through the slot 558a in arm 558. Slotted arm 558 is affixed upon the shaft 560 which carries arm 562, which arm in turn carries the pin 564. The outer end of spiral spring 566 is anchored upon pin 564, and the other end of this spring is affixed to the shaft 568 which forms the rotor or input shaft of the vertical speed transmitting selsyn motor 570. Affixed upon shaft 568 is the gear 572 which meshes with sector 574, this sector being pivoted upon the rod 576. The arm 575 is integral with sector 574, and is pinned to the yoke 578 carried by the upper end of the plunger 580 of dashpot 582.

The vertical speed transmitting selsyn motor 570 is connected by means of cable 584 to the vertical speed selsyn motor receiver 586 which forms a part of the vertical speed indicator designated generally by 588. As seen in Fig. 1, this indicator is mounted upon the instrument panel 29 within fuselage 12. Upon the output shaft 590 of the vertical speed receiver 586 is affixed the indicating needle 592 which is arranged to move over dial 594 which is calibrated like the vertical speed indicator of a real plane.

Inasmuch as shaft 546 is always positioned in accordance with the instant assumed vertical speed, it will be appreciated that gear 548, gear 550, shaft 552, arm 554 and pin 556 will all also be similarly positioned with respect to a predetermined zero vertical speed position. It will be appreciated that the shaft 560 is not driven degree for degree by the shaft 552, because shaft 560 is offset from shaft 552 and the logarithmic coupling arrangement including the arm 554, pin 556 and slotted arm 558 is interposed between these two shafts. This arrangement is employed because of the well understood logarithmic arrangement employed in marking the dial of the vertical speed indicator in a real plane as well as the dial 594. Inasmuch as the dial 594 is graduated logarithmically, it is necessary to provide the just disclosed arrangement in order that for a given movement of shaft 552 the shaft 560 will move the correct amount to cause needle 592 to change the reading of the vertical speed indicator 588 by an amount represented by the linear movement of shaft 552. Such being the case, shaft 560 always positions the needle 592 relative to the logarithmically calibrated dial 594 so that the reading of the vertical speed indicator 588 indicates the correct assumed vertical speed as given by the linear movements of shaft 552.

It will be appreciated that the pin 564 on arm 562 moves immediately in response to a movement of shafts 552 and 560. The spring 566 is employed to transfer the movement of pin 564 to the input shaft 568, and the gear 572 is meshed with sector 574 which is connected to dashpot 582 in order that a suitable time delay will be present between movements of pin 564 and the movement of the input shaft 568 of the transmitting selsyn 570. By employing this a suitable time delay will result between a change in indication given by the vertical speed indicator 588 and a change in the position of the vertical speed pivot rod 371 in Fig. 8. In this fashion the delayed indications given by the vertical speed indicator of a real plane may be simulated.

*Integration of vertical speed to produce assumed altitude*

Referring again to Fig. 12, the numeral 600 indicates a constant speed motor which may be controlled by the previously mentioned "ignition" switch in the trainer so as to be energized at all times while the trainer is in operation. The housing 602 contains a reversible variable speed transmission apparatus driven by motor 600, the output shaft of the transmission apparatus being numbered 604. For a detailed disclosure of such an apparatus reference may be made to United States Patent 2,405,957 dated August 20, 1946, and issued to Lloyd E. Jones for Variable-Speed Transmission. For the purposes of this application it is sufficient to know that the reversible variable speed transmission apparatus in housing 602 is responsive to the setting of vertical shaft 551, the position of which is always dependent upon the instant assumed vertical speed, so that the apparatus in housing 602 integrates assumed vertical speed with time, and positions the output shaft 604 in accordance with this integration. Accordingly, the output shaft 604 is always positioned from a predetermined neutral position in accordance with the instant assumed altitude—altitude being an integration of vertical speed and time.

Affixed upon the outer end of shaft 604 is the worm 606 which drives the worm gear 608 arranged to drive spur gear 610 through the shaft 611. Gear 612 rotates with gear 610, and drives gear 614 which is affixed upon the lower end of the rotor or input shaft 616 of the altitude transmitting selsyn motor 618. This motor is connected by electrical conductor 620 to the altitude receiving selsyn motor 622 which forms a part of the altitude indicator designated generally by 623. This indicator is positioned upon the instrument panel 29 in Fig. 1. The output shaft of the altitude indicator is designated 624 and drives the indicating needles 626 and 627. The indicating needles are arranged to move over dial 628 which is calibrated like the dial of the altimeter of a real plane. Inasmuch as shaft 604 is always positioned in accordance with the instant assumed altitude of the trainer, it will be appreciated that the indicating needles 626 and 627 always indicate to the student in the trainer the instant assumed altitude.

The gear 610 also drives the gear train including gears 630, 632, 634, 636, and 638, the last gear being affixed upon shaft 640 which also carries the sector 642 to which the previously mentioned altitude cable 268 is connected. As the factor of assumed altitude increases, it will be appreciated that the sector 642 is rotated counterclockwise as seen from above, and as seen in Fig. 4 the spring 262 will pull cable 268 to the left, resulting in a counterclockwise rotation of the altitude sector 258a about its pivot 264, as previously explained, to introduce the factor of assumed altitude into the engine computer shown in Fig. 4.

On the other hand, as the factor of assumed altitude is decreased, sector 642 will be rotated clockwise and the clockwise rotation of sector 642 will pull the altitude cable 268 to the right, and in Fig. 4 the altitude sector 258a will be rotated clockwise to decrease the altitude input into the engine computer.

In Fig. 12 it will be seen that arm 702 is affixed upon the shaft 640, and that this arm is arranged to engage the microswitch 708 when shaft 640 reaches a predetermined position indicative of a predetermined assumed high altitude, e. g., twenty thousand feet. Also carried by shaft 640 is the arm 704, separated from arm 702 by spacer 706, and arm 704 is arranged to engage microswitch 710 at a different predetermined low altitude, e. g., five hundred feet below sea level. The microswitches 708 and 710 are arranged to be opened when engaged by the arms 702 or 704, as the case may be, and these microswitches are in a circuit controlling the altitude drive motor 600. Consequently, when the assumed altitude reaches the predetermined upper limit, which may represent the absolute ceiling of the trainer, arm 702 will open microswitch 708 to stop motor 600, thereby preventing the trainer from reaching a higher assumed altitude. On the other hand, arm 704 may be arranged to open microswitch 710 when assumed altitude reaches the low predetermined limit, in which case microswitch 710 is opened and the main drive motor 600 is de-energized so that a lower assumed altitude indication will not be possible.

In Fig. 12 it will be seen that there is mounted upon the vertical speed shaft 552 a cam 712 which is arranged to engage the microswitch 716 at all times when a positive vertical speed is assumed to exist, that is, when shaft 552 is rotated clockwise of its neutral zero position. Also affixed upon shaft 552 is a second cam 714 which is arranged to engage microswitch 718 at all times when a negative vertical speed is assumed to exist, that is, when shaft 552 is counterclockwise of the zero vertical speed position. These two cams and switches are provided so that the variable speed drive motor 600 may be restarted when a vertical speed has been established that will carry altitude away from either the upper or lower limit, and the switches may be so placed in the circuit controlling the drive motor 600. For example, when cam 702 engages microswitch 708 to stop the drive motor 600 because the absolute ceiling of the trainer has been reached, as soon as shaft 552 is positioned in a negative vertical speed position, cam 714 engages microswitch 718 to establish an alternative circuit which will energize motor 600 to produce a decrease in altitude in accordance with the assumed rate of descent of the trainer.

In the other instance, when cam 704 engages microswitch 710 to stop the drive motor 600 because the lower altitude limit has been reached, when the shaft 552 is positioned in a positive vertical speed position microswitch 716 will be opened by cam 712, starting motor 600, in order that altitude may be increased as a result of the existent positive vertical speed.

This switching arrangement per se forms no part of my invention, and being known to the prior art, is not further illustrated herein.

*Auxiliary effect of assumed airspeed on attitude of fuselage*

In the case of a plane in actual flight, an increase in the air speed of the plane will result in a raising of the nose of the plane, while a decrease in the air speed will result in a lowering of the nose of the plane. The following means responsive to the air speed output of the flight computer of Fig. 8 simulate the effect of air speed upon the attitude of a real plane.

Referring to Fig. 8, it will be seen that the air speed selsyn motor transmitter 446 is connected through cable 454 to the electrical cable 455, which as shown in Fig. 6 connects with the air speed receiving selsyn motor designated generally by 750 and which includes the conventional housing 752 and output shaft 754. Affixed upon the output shaft 754 is gear 756 which drives the gear 758 mounted upon shaft 760 which is the input of the follow-up motor assembly shown in block form and designated 762. The output shaft of this assembly is 764, and upon this shaft is the gear 766 which drives gear 768 affixed upon shaft 770. Upon the outer end of shaft 770 is affixed the arm 772, and the rear end of link 774 is pivotally connected to the lower end of arm 772. The forward end of link 774 is pivotally connected to the left end of walking beam 776 which is pivotally held by means of pivot 778 which in turn is supported by arm 780, the right end of which is pivotally held by pivot 782. Pivot 782 is supported by bracket 784 which is affixed by screws 786 to the floor 12a of the trainer fuselage. Pivotally attached to the left end of arm 780 is the forward end of link 788, the rear end of which as shown in Fig. 4 is pivotally connected to the left end of lever 386 mounted upon the output shaft 397 of the power follow-up assembly designated generally by 304. In Fig. 6, it will be seen that the right end of walking beam 776 carries the pivot 790 which in turn supports the walking beam 792. Pivotally attached to the left end of walking beam 792 is the forward end of link 794, the rear end of which is pivotally connected to the left end of lever 796 which is pivoted upon stud 798 which in turn is affixed to the floor 12a by means of screws 800. To the right end of lever 798 is pivotally connected the forward end of link 802, the rear end of which is pivotally connected to the vertical arm 380 shown in Fig. 4, which arm, as previously explained, is movable to the rear in response to a nosing up of fuselage 12 and ahead in response to a lowering of the nose of fuselage 12.

Pivotally connected to the right end of the walking beam 792 is the forward end of link 804, the rear end of which is pivotally connected to the right end of arm 806 which has one end affixed upon shaft 808, which shaft is held by bearing 810 which is affixed to the floor 12a by means of screws 812. Affixed upon the lower end of shaft 808 is the arm 814, to the outer end of which is pivotally connected the left end of link 816, the right end of which is pivotally connected to the center leaf 818 of the elevator valve which is designated generally by 820. This valve is of conventional well-known construction, and includes the upper leaf 822, the center leaf 818, and the lower leaf 824. For present purposes, it is sufficient to know that when the center leaf 818 is rotated clockwise as seen from above, the pitching bellows are operated so that the forward bellows 17 expands and the rear bellows 18 contracts, resulting in a raising of the nose of the fuselage 12, and when leaf 818 is rotated counterclockwise, the rear pitching bellows 18 expands and the forward pitching bellows 17 contracts, resulting in a lowering of the nose of the fuselage 12.

In Fig. 6 the arm 780, stud 782, walking beam 776, stud 790, and walking beam 792 comprise what is commonly referred to in the art as the trim compound differential. This differential is designated generally by 793.

It will be appreciated that this differential includes three inputs and one output. The inputs are the factor of airspeed which is introduced by link 774, the factor of fuselage attitude which is introduced by link 794, and the factor of engine power output which is introduced by link 788. For the purpose of describing this differential, when any one input is moved, the other two inputs may be considered as being momentarily fixed, in order to provide suitable pivoting action of the various parts of the differential. The only output of the trim compound differential 793 is the link 804 which connects with the center leaf 818 of the elevator valve 820. It will be appreciated, generally, that a change in any one of the three inputs of fuselage attitude, engine power output, or air speed will result in a change in the output of the trim compound differential 793, and accordingly in a change in the position of the centerleaf 818 of the elevator valve 820. The movement of this centerleaf will result in a change in the attitude of fuselage 12 about its transverse pivot axis.

Referring back to Fig. 8, it will be recalled that the rotor 434 of the air speed transmitting selsyn 446 is always positioned relative to the housing 444 in accordance with the instant assumed air speed of the trainer. Consequently, by virtue of the electrical connections 454 and 455, the output shaft 754 of the airspeed receiving selsyn 750 in Fig. 6 will always be positioned relative to the fixed housing 752 in accordance with the factor of assumed air speed. The electrical connection may be such that upon an increase in the factor of assumed air speed the shaft 754 and the gear 756 affixed thereupon rotate counterclockwise in Fig. 6, rotating gear 758 and shaft 760 clockwise. By means of the follow-up assembly 762, which is merely a conventional type power amplifying assembly, shaft 764 and gear 766 will also be rotated clockwise, rotating gear 768 counterclockwise. On the other hand, when a decrease in the factor of assumed air speed occurs, the output shaft 754 of the selsyn receiver 750 will be rotated clockwise, and the elements driven by gear 756 including gear 768 will be rotated in the opposite direction from those just described, resulting in a clockwise rotation of gear 768. Consequently, the position of gear 768 at any time may be taken as a measure of the instant assumed air speed, the farther this gear being rotated counterclockwise from a predetermined neutral position the higher the assumed air speed.

When the factor of assumed air speed increases, resulting in a counterclockwise rotation of gear 768, shaft 770 rotates in the same direction moving the lower end of arm 772 and link 774 to the rear, and this link moves the left end of the walking beam 776 in the same direction, the walking beam pivoting about pivot 778. The right end of walking beam 776 moves ahead, as does stud 792 and link 804, walking beam 792 being pivoted about the point at which link 794 is connected thereto. The resulting forward movement of link 804 results in a movement to the right of link 816, through the medium of arm 806, shaft 808 and arm 814, and the center leaf 818 of the elevator valve 820 is rotated clockwise as seen from above, resulting in a raising of the nose of the fuselage 12.

On the other hand, when gear 768 is rotated clockwise in response to a decrease in the factor of assumed air speed, by means of the just described connecting elements which are moved in the opposite directions from that just described, the center leaf 818 of elevator valve 820 is rotated counterclockwise, resulting in a lowering of the nose of fuselage 12.

Accordingly, this application discloses means intermediate the flight computer shown in Fig. 8 and the elevator valve 820 to operate this valve in accordance with the factor of instant assumed air speed, so that when assumed air speed is increased the nose of fuselage 12 is raised, and so that when the factor of assumed air speed is decreased, the nose of fuselage 12 is lowered. Such responses simulate the change in attitude of a plane in actual flight in response to changes in air speed of the plane.

Of course, the apparatus may be arranged so that under cruising conditions (a given engine power output and a given air speed) the fuselage 12 will be in level flight attitude. Also, as is well known, the upper leaf 822 of the elevator valve is connected to the control wheel 30 so that upon fore and aft movements of the control wheel the upper leaf is turned to properly raise or lower the nose of fuselage 12, as the case may be.

*Effect of engine power output on fuselage attitude*

In the case of a plane in actual flight, an increase in the engine power output will result in a raising of the nose of the plane, while a decrease in the engine power output will result in a lowering of the nose of the plane. The following means utilize the assumed engine power output developed by the engine computer of Fig. 4 of this invention to similarly affect the attitude of fuselage 12.

Referring to Fig. 4, it will be recalled that the link 300 moves to the left in response to an increase in engine power output, and to the right in response to a decrease in the same factor. The lever 306 is controlled by arm 302 which is also controlled by link 300, so that when link 300 moves to the left, lever 306 rotates clockwise, moving the link 788 ahead, and when link 300 moves to the right, lever 306 rotates counterclockwise moving link 788 to the rear. In Fig. 6 it will be seen that when link 788 moves ahead, the arm 780 will move stud 778 in the same direction, and the movement of this stud will move the right end of walking beam 776 ahead, the walking beam in this instance pivoting about the point at which link 774 is attached thereto. Stud 790 will be moved ahead, as will the right end of walking beam 792, the walking beam pivoting about the point at which link 794 is connected thereto. The forward movement of the right end of walking beam 792 results in a similar motion of link 804, and as previously explained, when link 804 moves ahead the center leaf 818 of the elevator valve 820 rotates clockwise as seen from above, resulting in a raising of the nose of fuselage 12.

Without a detailed explanation, it will be appreciated that when the horsepower output link 300 in Fig. 4 moves to the right in response to a decrease in assumed engine power output, the just described parts will move in the opposite directions from those just pointed out, and the center leaf of the elevator valve 822 will be rotated counterclockwise as seen from above, resulting in a lowering of the nose of fuselage 12.

*Vertical stability*

In the case of a vertically stable airplane, when the nose of the plane is lowered by a pressing forward of the control wheel and the control wheel is then released, the inherent stability of the plane returns the nose of the plane to the previous flight attitude. On the other hand, when the nose of the plane is raised and the control wheel is released, the inherent stability of the plane returns the nose of the plane to the previous flight attitude.

The following arrangement simulates this inherent vertical stability of a real plane.

Referring to Fig. 4, it will be recalled that when the nose of fuselage 12 is raised, the vertical arm 380 is moved to the rear, and that when the nose of the fuselage is lowered, the arm 380 moves ahead. When arm 380 moves to the rear in response to a raising of the nose of the fuselage, the link 802 moves in the same direction, and referring to Fig. 6 it will be seen that the lever 796 will be rotated clockwise as seen from above, resulting in a forward movement of link 794 and of the left end of walking beam 792 which is pivoted about pivot 790. Link 804 moves to the rear, and as previously explained, when link 804 moves in that direction the center leaf 818 of the elevator valve 820 is rotated counterclockwise as seen from above, resulting in a lowering of the nose of fuselage 12. Accordingly, when the nose of fuselage 12 is raised, the intermediate connection just described operates the center leaf of the elevator valve to tend to return the nose to the previous flight attitude.

On the other hand, when the nose of fuselage 12 is lowered, the just described elements move in the opposite directions from the directions just mentioned, and the center leaf 818 of the elevator valve 820 is rotated clockwise to tend to raise the nose of the fuselage.

*Vertical hunting effect*

Assuming that a plane in actual flight is flying trimmed for straight and level flight and that the pilot pushes ahead on the elevator control and retains it in that position until the plane assumes a gliding angle, if the pilot then releases the elevator control, the elevators and the elevator control will return to their trimmed neutral positions. The airplane will continue to dive.

losing altitude and gaining speed, and the forces acting upon the plane will become such that the nose of the plane will slowly rise until the plane is in level flight. When the plane reaches level flight, its air speed will be at a maximum and substantially above that at which it was at the beginning of the maneuver, and its altitude will be substantially below the initial altitude. The increased air speed of the plane will continue to raise the nose of the plane above the level flight attitude and the plane will begin to climb resulting in a loss of air speed. When the plane reaches the approximate altitude which it had when the maneuver was begun, the air speed will be approximately the initial air speed, and the nose of the plane will be raised to a maximum. Consequently the plane will continue to gain altitude, the air speed will continue to drop, and the nose of the plane will start to fall. Finally, the plane will be in level flight at an altitude substantially higher than the initial altitude, but by an amount less than the previously low altitude was below the initial altitude. At this point of level flight the air speed of the plane will be substantially below the initial air speed, but again it will not be as far below the initial air speed as the maximum air speed was above the initial air speed when the plane was at the lowermost altitude. Inasmuch as the air speed is substantially below the initial straight and level flight air speed, the nose of the plane will then start to drop and the plane will start to lose altitude and gain air speed until it is at the initial altitude, when the air speed will be approximately the initial air speed. However, at this point the nose of the plane will be pointed downwardly, but not so sharply as when the pilot originally placed the nose of the plane downwardly to start the maneuver. Consequently the cycle will be repeated several times, each successive cycle marked by lesser variations in air speed, altitude and attitude, until finally, the plane is again flying straight and level at about the initial air speed and altitude. Of course the air speed indicator, altimeter, vertical speed indicator, artificial horizon, etc. reflect the various described changes.

The just described response of a plane in actual flight to a change in attitude of the plane is known as "hunting." It seems clear without a detailed explanation that should a plane trimmed for straight and level flight be placed in a climbing position and the elevator control released, the plane will also go through the previously described phases until it is finally again flying straight and level at approximately the initial air speed and initial altitude. However, in this case the cycles are started at 180 degrees from the points of starting of the cycles when the elevator control is pushed ahead and released.

The previously described apparatus of this application operates to change the attitude of the fuselage 12, the indicated assumed air speed, and the operation of the other instruments in response to a placing of the fuselage in a climbing or diving position, just as occurs in the hunting of a plane in actual flight. Such operation will now be described.

Referring to Fig. 6, when the control wheel 30 is pushed ahead of its neutral position, the upper leaf 822 of the elevator valve 820 is rotated clockwise from its neutral position and vacuum is admitted to the front pitching bellows 17 simultaneous with the admission of vacuum to the rear pitching bellows 18. Fuselage 12 therefore assumes a diving attitude. With the fuselage in a diving attitude, referring to Fig. 4, it will be recalled that the arm 380 is moved ahead of its neutral position, moving link 802 and the intermediate elements connecting link 802 with the center leaf 818 of the elevator valve 820, so that the center leaf 818 of the elevator valve is also rotated clockwise of its neutral position. Consequently, both the upper leaf 822 and the middle leaf 818 of the elevator valve are rotated clockwise of their neutral positions, but because of the linkage arrangement the upper leaf 822 is rotated farther clockwise from its neutral position than is the center leaf 818. Accordingly, vacuum is continued to be admitted to the front pitching bellows and atmosphere to the rear pitching bellows 18.

At the same time, referring to Fig. 4, the forward movement of arm 380 results in a similar movement being imparted to link 382 and, as shown in Fig. 8, when link 382 moves ahead, the input linkage 370 of the flight computer shown in Fig. 8 is moved, changing the attitude input to the flight computer so that the horsepower required link 364 moves to the left, resulting in an excess of horsepower available over horsepower required. Accordingly, the air speed integrator including discs 500 and 506 is operated so that the assumed air speed of the trainer is increased, and this increased air speed is not only shown by the air speed indicator 464, but also the air speed transmitting selsyn 446 through the intermediate connecting apparatus results in a counterclockwise rotation of the gear 768 shown in Fig. 6, which gear as previously explained, is always positioned in accordance with the factor of assumed air speed. At this point it should be noted, however that there is a substantial lapse of time between the placing of the fuselage in the diving attitude and in the increase in indicated air speed shown by the air speed indicator 464 and in the repositioning of gear 768 of Fig. 20, because of the time lag inherent in the air speed integrator in Fig. 8. At the same time, it should be noted that the movement of the center leaf 818 of the elevator valve 820 in response to a diving of the fuselage 12 is immediate because of the direct mechanical connection. As the assumed air speed gradually increases, gear 768 is gradually rotated farther counterclockwise, and the center leaf 818 of the elevator valve is gradually moved clockwise, but the upper leaf 822 will still be positioned further clockwise than the center leaf, so that vacuum is still admitted to the front and atmosphere to the rear pitching bellows.

Consequently, the forward movement of the control wheel and the resultant placing of the fuselage 12 in a diving position has three distinct effects, viz., the clockwise rotation of the upper leaf 822 of the elevator valve, the clockwise but lesser rotation of the center leaf 818 of the elevator valve as a result of the diving of the fuselage, and a delayed operation of the gear 768 in Fig. 6 as a result of the increase in assumed air speed caused by the diving of the fuselage. The rotation of gear 768 also imparts a further clockwise rotation to the center leaf of the elevator valve, but because of the linkage values, the upper leaf 822 is still rotated farther clockwise than center leaf 818, and vacuum is still admitted to the forward pitching bellows and atmosphere to the rearward pitching bellows.

If, then, the control wheel is released, by well known means well understood by those skilled in the art, the upper leaf 822 of the elevator valve is returned to its neutral position, and inasmuch as the center leaf 818 is still rotated clockwise of its neutral position, it will admit atmosphere to the forward pitching bellows and vacuum to the rearward pitching bellows, resulting in a gradual raising of the nose of fuselage 12. As the assumed air speed continues to increase, this factor will tend to rotate the center leaf 818 farther clockwise, and the rate of raising of the nose of fuselage 12 will tend to be increased. Inasmuch as the nose of the fuselage is down, the positioning to the rear of arm 380 in Fig. 4 will tend to rotate the center leaf 818 slowly clockwise in response to the change in fuselage attitude. Accordingly, both the increased air speed and the nose down attitude of the fuselage tend to raise the nose of the fuselage to the level flight position. However, as long as the nose of the fuselage is pointed downwardly, the assumed airspeed will increase. When the fuselage has reached the level flight position, the center leaf 818 of the elevator valve would be centered were it not for the fact that assumed air speed is higher than the initial air speed, so the center leaf is still rotated clockwise from its neutral position. Atmosphere is still admitted to the forward pitching bellows and vacuum to the rear pitching bellows, resulting in a raising of the nose of the fuselage above the level flight position. As the nose of the fuselage continues to rise above its level flight position, the arm 380 in Fig. 4 will be moved slowly to the rear, as will link 802 in Fig. 6, and a gradual counterclockwise rotation will be imparted to the center leaf 818 of the elevator valve, tending to overcome the clockwise rotation of this leaf caused by the still present high assumed air speed. At the same time, the raising of the nose of the fuselage affects the link 370 which is the attitude input of the flight computer in Fig. 8, so that the horsepower required exceeds the horsepower available, resulting in an operation of the air speed integrator and in a lower assumed air speed. Consequently, not only does indicator 464 indicate a gradual lessening of the assumed air speed, but gear 768 in Fig. 6 is slowly rotated clockwise, and as the air speed drops off the clockwise rotation of the center leaf as a result of the higher assumed air speed lessens, and the tendency of the raised nose to rotate the center leaf counterclockwise is sufficient to overcome the increased air speed effect upon the position of center leaf 818. Accordingly, the center leaf slowly moves counterclockwise past its center position, and vacuum is admitted to the front pitching bellows and atmosphere to the rear pitching bellows. The nose of the fuselage tends to drop from the climbing position to the level flight position. Assumed air speed continues to drop until finally the fuselage is in level flight and the assumed air speed is substantially below the initial air speed. Inasmuch as the fuselage is level, the link 802 and input to the trim compound differential 793 is centered, and insofar as its direct influence upon the center leaf 818 of the elevator valve is concerned, the center leaf would be centered. However, at this point the assumed air speed is substantially below the initial air speed, and so the center leaf 818 is positioned counterclockwise of its neutral position, admitting vacuum to the fore pitching bellows and atmosphere to the rear pitching bellows. Accordingly, fuselage 12 gradually assumes a diving attitude, and as it does so, the direct mechanical connection from arm 380 in Fig. 4 tends to position the center leaf 818 clockwise of its neutral position. However, the low assumed air speed predominates and center leaf 818 is positioned counterclockwise from its neutral position, so the nose of the fuselage continues to drop. When the initial assumed altitude is reached, the nose is pointed downwardly and the air speed has increased to the approximate initial speed, the same conditions then prevail as at the beginning. Inasmuch as the same conditions then prevail as at the beginning of the maneuver, it seems clear that the cycle will be repeated.

In view of the above, it will be seen that the direct mechanical connection from the arm 280 in Fig. 4, which arm is responsive to changes in the pitching of fuselage 12, to the center leaf 818 of the elevator valve operates this leaf in such a manner that the fuselage is always returned to the level flight position. If this were the only factor, no perceptible hunting would occur. However, the positioning of the center leaf 818 by the air speed unit which is responsive to changes in the fuselage attitude lags behind the positioning of leaf 818 responsive to changes in fuselage attitude, so that the hunting effect is obtained.

It has been explained that the indications given by the air speed indicator 464 change with the functioning of the flight computer of Fig. 8 to properly indicate the cyclical changes in assumed air speed which occur simultaneously with the hunting effect. It should also be appreciated that the altimeter 623 and vertical speed indicator 588 shown in Figs. 1 and 12 are also operated by the flight computer of Fig. 8, as previously explained, to reflect the cyclical changes in assumed vertical speed and assumed altitude which occur while the hunting effect is taking place.

It should be appreciated without a detailed explanation that if the fuselage 12 is in straight and level flight and the student displaces the control column to the rear of its neutral position to place the fuselage in a climbing position, upon a releasing of the control column and its return to the neutral position, the air speed system is operated to introduce a lower assumed air speed, and when combined with the repositioning of the center leaf 818 of the elevator valve 820 resulting from the raising of the nose of the fuselage, the hunting effect will be set in operation. Of course, in this case, the first phase of the hunting would be a decrease in air speed and a gain in altitude, rather than an increase in air speed and a loss in altitude.

Again, referring to the case of a plane in actual flight, if the plane is flying straight and level an increase in power setting or a decrease in power setting will also cause the plane to hunt. In case the power setting is increased the first phase of the hunting is an increase in air speed and a resulting raising of the nose of the plane. The plane gains altitude, but the gaining of altitude results in a lowering of the air speed and in a lowering of the nose of the plane. The plane levels off at a higher altitude and because the air speed has dropped below the initial air speed, the nose of the plane will drop, resulting in a diving of the plane. The dropping of the nose of the plane results in a loss of altitude and in an increase in air speed and the increase in air speed results in a raising of the nose of the plane. The hunting continues until the plane attitude remains constant insofar as pitch attitude is concerned, but the nose of the plane will be slightly higher than it was before the applied increase in power. On the other hand if a plane is in straight and level flight a decrease in power setting will cause the plane to hunt. The first phase of the hunting will be a loss in air speed and then the nose of the plane will drop resulting in a gliding and increase in speed and a raising of the nose, etc. The hunting will eventually terminate with the plane in a constant pitch attitude with the nose of the plane somewhat lower than before the decrease in power setting occurred.

An increase or decrease in assumed engine power output of the apparatus of this invention will cause the trainer to operate in a manner simulating the hunting of a plane in actual flight as a result of a change in power output of the engine. Referring to Fig. 4, assuming that a decrease in assumed engine power output occurs, the link 788 will move to the rear, and referring to Fig. 6, through the previously described interconnecting means the center leaf 818 of the elevator valve 820 will be rotated counterclockwise, resulting in an admission of vacuum to the front pitching bellows and of atmosphere to the rear pitching bellows. The fuselage 12 will assume a slight nose-down attitude.

At the same time, the decrease in assumed engine power output will affect the operation of the flight computer in Fig. 8 to produce a lower assumed air speed. As a result of this lower assumed air speed the link 774 in Fig. 6 will move ahead, and through the intermediate connecting linkages and levers the center leaf 818 of the elevator valve will be given an additional counterclockwise rotation, causing the fuselage 12 to assume a greater diving position.

As the fuselage 12 assumes a diving position as a result of the decrease in engine power output and decrease in air speed, the vertical arm 380 in Fig. 4 will be moved ahead, as will link 802. Through the intermediate connecting elements the nosing down of the fuselage will tend to impart a clockwise rotation to the center leaf 818 of the elevator valve. However, the air speed and power effects upon the center leaf predominate, and the center leaf 818 is positioned counterclockwise from its neutral position so the trainer fuselage continues its nose-down attitude.

Figure 15:
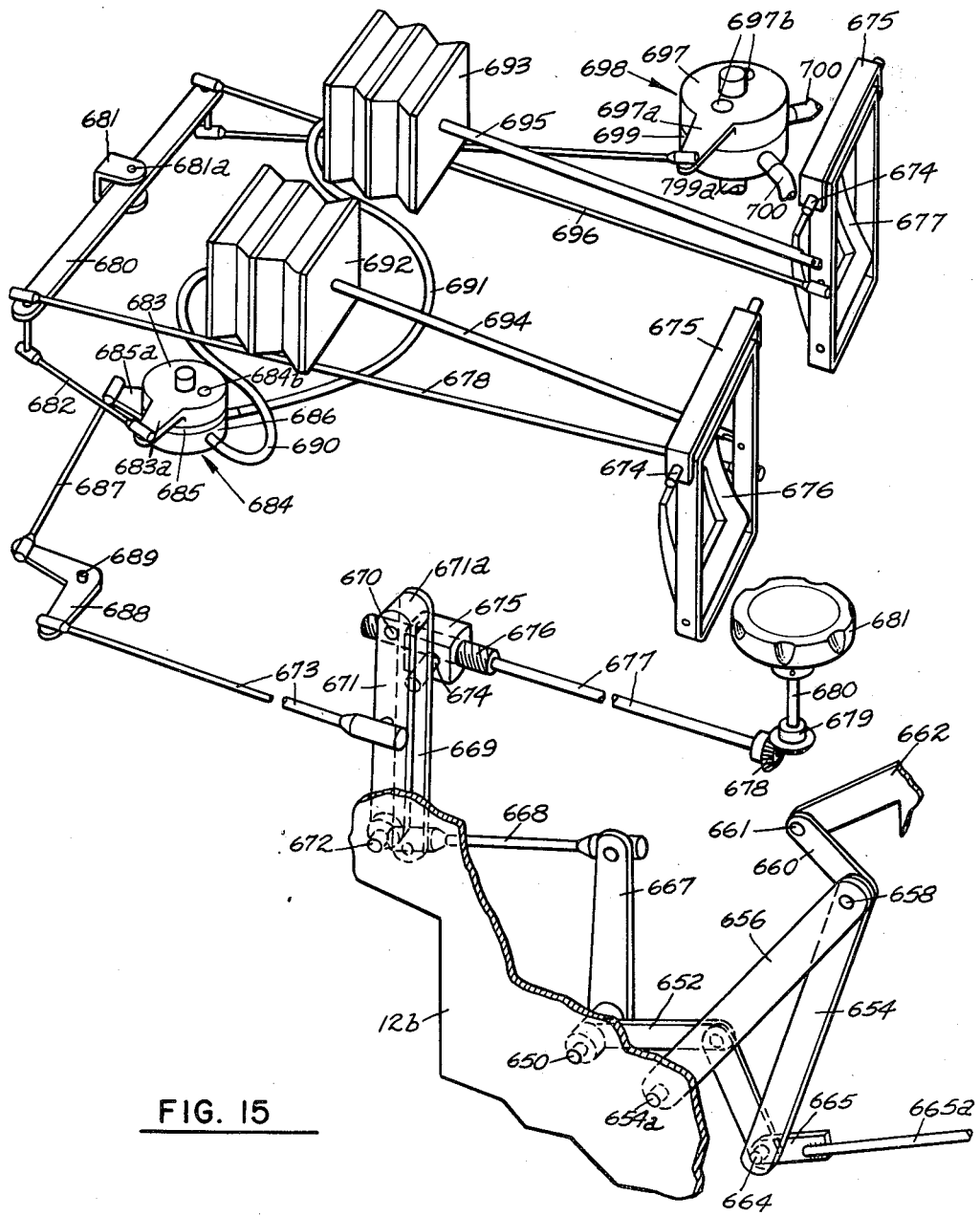
Fig. 15 shows the rate of turn computer as well as certain parts of the prior art trainers associated therewith.

However, the nosing down of the trainer fuselage also results in a change in the attitude input of the flight computer in Fig. 8, so that the horsepower required becomes less, and an increase in assumed air speed will gradually be produced. As this increase in air speed builds up, the decrease in air speed as a result of the lesser engine power output is overcome, and the center leaf 818 of the elevator valve in Fig. 15 is moved clockwise. This rotation of the center leaf as a result of the increase in air speed eventually overcomes the previous counterclockwise rotation of the leaf, and the nose of fuselage 12 starts to rise. The increasing air speed and the nose-down position of the fuselage both tend to raise the nose of the fuselage until it is in the level flight position. When this position is reached the assumed air speed is higher than the initial air speed so the center leaf 818 of the elevator valve is rotated clockwise from its neutral position and the nose of the fuselage continues to rise. As the nose of the fuselage continues to rise, the arm 380 in Fig. 4 moves to the rear, and through the intermediate connecting elements the center leaf 818 is turned counterclockwise. Also, a raising of the nose of the fuselage causes the air speed to drop off, through the operation of the flight computer, and this decrease in air speed also tends to rotate the center leaf 818 counterclockwise. When assumed air speed has dropped sufficiently far, the climbing attitude of the fuselage and decrease in assumed air speed will have rotated the center leaf counterclockwise from its neutral position and vacuum will be admitted to the front pitching bellows and atmosphere to the rear pitching bellows. The nose of the fuselage will drop until the fuselage is in the level flight position, at which time the assumed air speed will be substantially below the initial air speed. Accordingly, the center leaf of the elevator valve will be positioned counterclockwise from its neutral position, and vacuum will be admitted to the front pitching bellows and atmosphere to the rear pitching bellows. The fuselage will therefore assume a diving attitude, and the cycle will be repeated.

On the other hand, assuming that the fuselage 12 is in straight and level flight, an increase in assumed engine power output will position the center leaf 818 clockwise of its initial position and consequently the fuselage will have a tendency to nose up. The increase in assumed air speed as a result of the higher power setting will then start the hunting effect, and the successive changes in assumed air speed, being out of phase with the attitude of the fuselage will produce the simulated hunting effect.

It may be concluded, therefore, that this invention discloses means for simulating the hunting of a plane in actual flight caused by a placing of the plane in a diving or climbing attitude, and a subsequent releasing of the control column, or by a change in power setting.

The air speed indicator 464, the vertical speed indicator 588, and the altimeter 623 all have their readings cyclically changed during the hunting process by virtue of their connection to the flight computer shown in Fig. 11.

*Flaps effect*

Reference is now made to Fig. 8 where the simulated flaps control lever is designated by 840. The position of this lever is also shown in Fig. 1. Lever 840 is pivotally mounted upon the pivot 842, and the lower end of this lever controls the switch 844 shown in block form. Switch 844 is connected through cable 846 to the terminals 847 of the reversible motor 848. When lever 840 is moved to the rear of its neutral position, to simulate the raising of the flaps in a real plane, motor 848 may be energized to rotate its output shaft 850 and the gear 852 affixed thereupon counterclockwise as seen from above, and sector 854 rotates in the opposite direction as does the vertical shaft 856 and the arm 858 affixed upon the upper end of shaft 856. The stud 312 will be moved clockwise, and the link 314 will be moved to the rear, increasing the horsepower available, and resulting in a higher assumed air speed. At the same time the block 405 affixed upon shaft 856 will be rotated with shaft 856, moving pivot 404 and the left end of arm 402 to the rear, arm 402 pivoting about stud 401. The right end of arm 402 moves ahead, as does link 406. It will be recalled that when link 406 moves ahead, the attitude input to the flight computer produces an algebraic decrease in assumed vertical speed and a decrease in horsepower required. Consequently, air speed will increase. To maintain the attitude of the fuselage constant and the same air speed and vertical speed, the student in the trainer merely retards the throttle lever 160 the proper amount and moves control wheel 30 slightly to the rear.

On the other hand, when the flaps control lever 840 is moved in the opposite direction, motor 848 will be energized to rotate the output shaft 850 and the gear 852 clockwise as seen from above, while sector 854, shaft 856 and arm 858 will be rotated counterclockwise, moving pivot 312 counterclockwise and link 314 ahead, resulting in an input of a lesser assumed horsepower available, and a decrease in assumed air speed. Through link 406 a higher assumed vertical speed results, as does a higher horsepower required, further tending to drop assumed air speed. To maintain the original air speed and vertical speed, the student has only to move the throttle lever and control wheel ahead.

When the flaps lever 840 is in the neutral position, of course no simulated flaps effect is introduced.

Accordingly, the lever 840 which simulates the flaps control lever of a real plane properly affects the indicated assumed air speed and vertical speed, and the student in the trainer may regulate the air speed and vertical speed by proper movements of the control wheel and throttle lever.

At the same time that the simulated flaps effect is being introduced into the flight computer of Fig. 8, by means of gear 860 which is affixed upon the input shaft (not shown) of the selsyn type flaps transmitter 862, the flaps transmitter 962 is operated according to the assumed positions of the flaps. Transmitter 862 is connected by electrical cable 864 to the flaps selsyn type receiver 868 which has a dial 869 graduated like the flaps indicator of a real plane. Affixed upon the output shaft (not shown) of the flaps receiver is the indicating element 870 which is arranged to move over dial 869.

By virtue of this arrangement, well known to those skilled in the art, the running of motor 848 through the selsyn-type transmitting system causes the flaps indicator 868 to indicate to the student in the trainer the assumed position of the flaps.

*Mush effect*

In the case of a plane in actual flight when the air speed falls to a certain value, depending upon the flight characteristics of the plane, even though the attitude of the plane about its transverse axis is not changed, the plane rapidly loses altitude. This effect is simulated by the apparatus of this invention in the following manner:

Referring to Fig. 6 there is provided the gear 870 affixed upon shaft 770, which gear drives the gear 872 affixed upon the left end of shaft 874. The arm 876 is affixed upon the right end of shaft 874, and pivotally attached to the upper end of arm 876 is the forward end of link 878, the rear end of which is shown in Fig. 8. Affixed upon the rear end of link 878 is the block 878a, and the rear end of link 878 passes through the block 878b carried by the upper side of arm 878c. The left end of arm 878c is pivotally carried by the lower end of stud 404, and to the right end of arm 878c is pivotally attached the forward end of link 879. The rear end of link 879 is pivotally attached to the outer end of arm 879a, as seen in Fig. 12. The opposite end of arm 879a is affixed upon the upper end of shaft 880, upon the lower end of which is mounted one end of arm 882. A compensating spring assembly designated generally by 883 is provided, and this assembly is identical in construction with that disclosed in detail in Fig. 11. The outer sleeve of this assembly is designated 884 and is connected to arm 882. To the outer end of arm 882 is connected one end of the tension spring 886, the other end of which is anchored upon the fixed member 888. A stop 890 is provided to limit the counterclockwise travel of arm 882. The assembly 883 is carried by link 892, the left end of which is connected to the stud 894 carried by the movable bellows member 896. The stud 898 is also carried by member 896, and the right end of link 900 is pivotally attached to the outer end of stud 898. The left end of link 900 is pivotally connected to the bell crank 561 which is pivoted upon stud 563.

Referring to Fig. 6, it will be appreciated that as the factor of assumed airspeed decreases the gear 870 is rotated clockwise and the gear 872, shaft 874 and arm 876 are rotated counterclockwise, moving link 878 ahead. In Fig. 8 it will be appreciated that when the assumed airspeed falls to a predetermined amount the block 878a will engage block 878b, rotating arm 878c counterclockwise as seen from above and moving link 879 ahead. In Fig. 12, when link 879 moves ahead, by means of arm 879a, shaft 880 and arm 882 the assembly 883 and link 892 are moved to the left, moving the bellows member 896, stud 898 and link 900 in the same direction. The bell crank 561 is rotated counterclockwise as seen from above and block 559 which is attached to the sheathing 557 moves the lower end of the sheathing to the rear. Inasmuch as the upper end of the sheathing is affixed to housing 602 by means of clamp 657a, the rearward movement of the lower end of sheathing 557 will result in a pulling upon the flexible cable 555, and referring to Fig. 8 it will be seen that the arm 530 will be moved counterclockwise as seen from above, disengaging contact strip 536 from the contact 529. The vertical speed motor 544 in Fig. 12 will be energized in the direction of a lower assumed vertical speed, and through the apparatus interconnecting this motor with the vertical speed transmitter 570 and vertical speed receiver 623 a lower assumed vertical speed indication will result. At the same time the energization of the vertical speed motor 544 will result in a counterclockwise rotation of the pulley 553, and the flexible cable 555 will be released. Spring 563 in Fig. 8 will pull the cable 555 ahead, resulting in a clockwise rotation of arm 530 and of the contact plates 536 and 538. The vertical speed motor 544 will continue to run until arm 530 has been moved back to its original position. The lower assumed vertical speed indication will continue, thus indicating a loss of altitude.

This lower vertical speed indication will continue until such time as the factor of assumed airspeed has increased sufficiently to move the block 878a in Fig. 8 from the block 878b. At such time the apparatus will function in the opposite directions from the directions of functioning when the mush effect occurred, and the vertical speed indication will return to normal.

*Rough air effects*

Referring to Fig. 12, it will be seen that the movable bellows member 896 forms a portion of the rough air bellows assembly designated generally by 902. This assembly includes the central movable member 896 and two fixed side members 904 and 906 which may be affixed to the bottom 12a of the fuselage floor by means of screws 908. The bellows is covered by fabric 910, in the conventional manner. The bellows formed by movable member 896 and the fixed member 904 is connected through the pneumatic line 912 with the rough air generator shown in block form and numbered 914. The bellows formed by the central member 896 and the fixed member 906 is connected through pneumatic line 916 with the rough air generator.

As is well known to those skilled in the art, the rough air generator may be employed to alternately raise and lower the pressures in pneumatic lines 912 and 916, to cause the central movable bellows member 896 to move back and forth in an irregular pattern. As the member 896 so moves, it will be appreciated that the link 900 is reciprocated, resulting in a reciprocation of the flexible cable 555. Accordingly, the arm 530 in Fig. 8 will be alternately irregularly moved clockwise and counterclockwise, alternately disengaging the contact 529 from the contact plates 536 and 538, and resulting in an energization of the vertical speed motor 544 in Fig. 12, first in one direction and then in the other.

Accordingly, the vertical speed indicator 623 which is responsive to the running of the vertical speed motor 544 will indicate a fluctuating assumed vertical speed, simulating the fluctuating vertical speed of a real plane flying in rough air.

It will be appreciated that the spring assembly 883 is provided in Fig. 12 in order to permit the movement of the movable bellows member 896 as a result of the operations of the rough air generator 914.

In order to simulate the effect of rough air upon the air speed indications of a plane in actual flight the following apparatus may be employed. Referring to Fig. 8, it will be seen that the rough air generator 914 is arranged to reciprocate the flexible cable 920 which is supported by sheathing 922. The lower end of cable 920 is connected to the arm 922 which is affixed to the housing 444 of the airspeed transmitter 446. The upper end of spring 924 is connected to arm 922, and the lower end of this spring is held by the fixed member 926. The running of the rough air generator produces an irregular reciprocation of the flexible cable 920, and by means of the arm 922 affixed upon housing 444, the housing is alternately irregularly rotated through small angles of various magnitudes. As is well understood by those skilled in the art, these movements of the housing 444 will produce corresponding movements of the needle 460 of the airspeed indicator 464. In this manner the effects of rough air upon the indicated airspeed of a real plane will be simulated.

*Simulated engine power output and airspeed effects upon turning*

Assuming that a conventional single engine plane is trimmed for straight and level flight, when the power output of the engine is increased the plane tends to turn toward the left. When the power output is decreased the plane tends to turn toward the right.

The change in engine power output, of course, results in a change in the airspeed of the plane and this resultant change in airspeed also produces a turning of the plane to the right or left. In the event that engine power output is increased, an almost immediate turning of the plane to the left occurs as a direct result of the change in power output, and as the air speed of the plane gradually increases as a result of the increased engine power output, the increased air speed tends to turn the plane to the right, lessening the net turning of the plane to the left. The plane must be retrimmed in order to maintain straight and level flight.

On the other hand, when the engine power output is decreased, the plane almost immediately tends to turn toward the right and as air speed gradually falls off the effect of the lower air speed tends to cancel the turning of the plane to the right. However the net effect will be a turning to the right and the plane must be retrimmed.

The following disclosed apparatus of my invention may be combined with the apparatus disclosed in the said Patent 2,485,292 for Aviation Trainer in order to accurately simulate the engine power output and air speed effects upon the turning of a plane in actual flight.

Reference is now made to Fig. 13 which is a graph showing the effect of the factors of air speed and throttle lever setting on the turning of a typical plane. It will be noted that as throttle is advanced from idle toward full, air speed remaining constant, the tendency for the plane to turn to the left is increased, and also, that as air speed increases, throttle remaining constant, the tendency of the plane to turn to the right is increased. The rate of turn for any selected throttle setting and air speed may be ascertained from Fig. 13.

Figure 14:
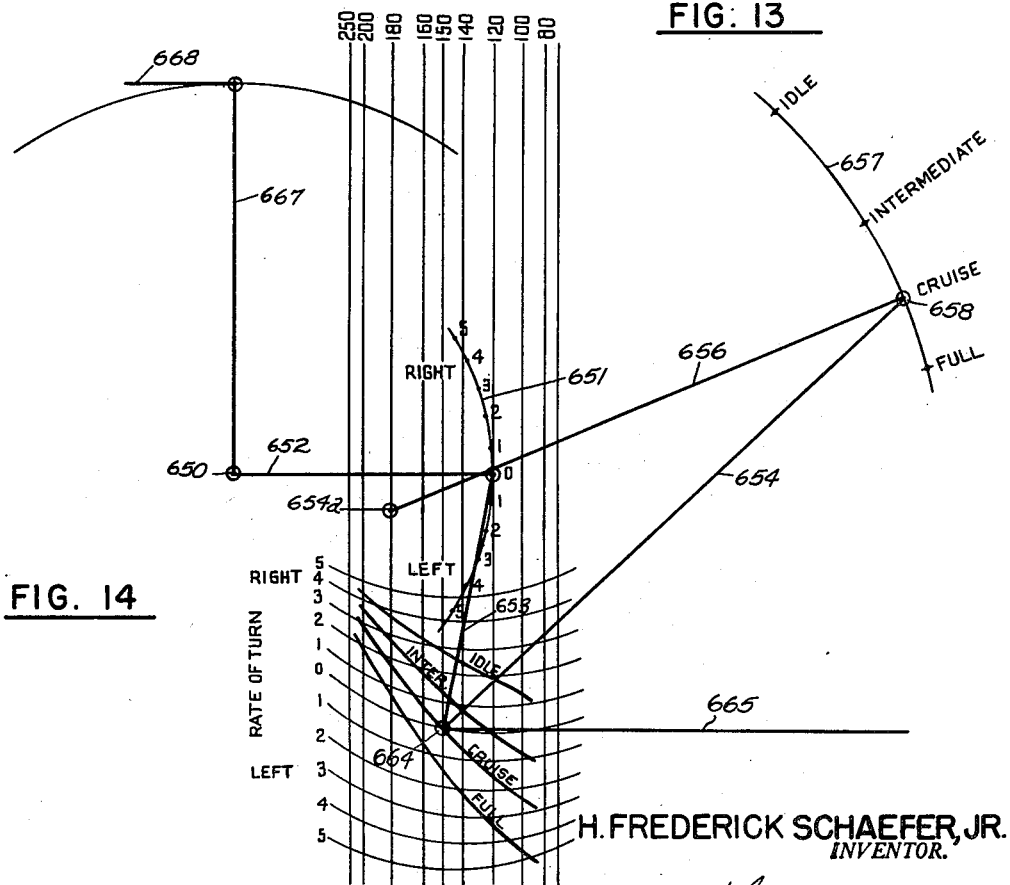
Fig. 14 shows the information given by Fig. 13 replotted in a form lending itself to the design of a suitable computing apparatus, as well as schematically showing certain parts of the rate of turn computer.

Reference is now made to Fig. 14 where the graph shown in Fig. 13 is replotted in a form that lends itself to the design of a suitable computer, and to Fig. 15 which shows the actual computer. In Fig. 14, the air speed lines are drawn in on a scale corresponding to the graduations on the dial 462 of air speed indicator 464. The pivot point 650 was selected, and the turn arc 651 was drawn from pivot 650 on a radius equal to the length of link 652. The arc 651 was divided into equal increments to either side of the center of the arc, the upper increments being designated "Right" and the lower "Left." These increments were numbered 5, 4, 3, 2, 1, 0, 1, 2, 3, 4 and 5. A radius equal to the length of link 653 was selected, and from each of the marks on arc 651 a series of generally parallel arcs were drawn crossing the air speed lines. These latter arcs were labeled 5, 4, 3, 2, 1, 0, 1, 2, 3, 4 and 5. The idle, intermediate, cruise and full throttle lines were then drawn in on the chart, these throttle lines crossing the air speed lines and turn arcs at values corresponding to the valves on Fig. 13.

The center of each of the arcs formed by the throttle setting lines was determined, and these four points were labeled "Idle," "Intermediate," "Cruise" and "Full," and are shown in the upper right of Fig. 14. A link 654 having a length equal to the radius of these arcs was selected, and the lower end of link 654 was pivoted to the lower end of link 653 by means of stud 664. The center of an arc 657 which passes through the four last mentioned points was determined, and this point is fixed pivot 654a. A link 656 equal in length to the radius from fixed pivot 654a to the throttle position arc 657 was selected, and the outer end of link 656 was pivoted to the upper end of link 654 by stud 658.

In Fig. 15 it will be seen that the lower end of link 660 is carried by stud 658, and the upper end of this link is pivoted to stud 661 carried by the arm 662 which, as shown in Fig. 6, is integral with bell crank 165 which is responsive to the setting of the throttle lever 160. In Fig. 15, the forward end of link 665 is mounted upon stud 664, and to the rear end of link 665 is affixed the forward end of link 665a, the rear end of which is pivotally attached to the upper end of arm 666, which arm is mounted upon the left end of shaft 770 which is positioned by the air speed follow-up motor 762 to be a true measure of the instant assumed air speed.

In Fig. 15 the arm 667 is integral with arm 652, to form a bell crank therewith, and pivotally attached to the upper end of arm 667 is the rear end of link 668, the forward end of which is pivotally connected to the lower end of walking beam 669. The upper end of walking beam 669 is pivoted upon stud 670, as is the upper end of arm 671, having the integral bore 671a. The lower end of arm 671 is pivoted upon pin 672 held by the fixed member 12b which forms a portion of fuselage 12. The rear end of link 673 is pivotally attached to arm 671. Walking beam 669 carries the outside end of stud 674, the inside end of which is carried by nut 675 mounted upon screw 676 which is integral with the forward end of shaft 677, upon the rear end of which is affixed the bevel gear 678 driven by the bevel gear 679 mounted upon the lower end of shaft 680, upon the upper end of which is mounted the control wheel 681 which simulates the rudder trim control of a real plane.

Considering now the functioning of the torque computer shown in Figs. 14 and 15, the position of the throttle lever 160 positions pivot 661, and link 660 in turn positions the pivot 658 along the throttle arc 657 in accordance with the instant throttle lever setting. The link 654 positions pivot 664 along one of the four throttle setting arcs in the lower part of Fig. 14, or intermediate one of these arcs, depending on the position of pivot 658. The link 665 positions pivot 664 relative to the parallel air speed lines in accordance with the instant assumed air speed. Accordingly, pivot 664 is properly vertically positioned relative to the rate of turn arcs in the lower part of Fig. 14 in accordance with the instant setting of the throttle lever and air speed. The vertical position of pivot 664 is transferred by link 653 to arms 652 and 667, and to link 668 which in turn positions the lower end of walking beam 669 about stud 674. The upper end of arm 671 and link 673 are similarly positioned.

At this point the statement is merely made that the turning of fuselage 12 about its vertical axis is dependent upon the position of link 673, and inasmuch as the position of link 673 is dependent upon the factors of throttle lever setting and assumed airspeed, it will be appreciated that the rate of turning of the fuselage 12 is dependent upon the assumed air speed and throttle lever setting.

As the factor of assumed air speed increases, links 665a and 665 move ahead, pushing link 653 upwardly and rotating bell crank arms 652 and 667 counterclockwise, moving link 668 and the lower end of walking beam 669 ahead. The upper ends of bell crank 669 and of arm 671 move to the rear as does link 673, causing the fuselage to tend to turn to the right as a result of the increase in assumed air speed.

When the throttle lever 160 is moved to the rear, bell crank 166 is rotated clockwise, pulling link 660 upwardly and moving the pivot 658 ahead and up. Link 654 moves pivot 664 in the same general direction, and link 653 is moved upwardly. This motion of link 653 is transmitted, as previously explained, to link 673 which is moved to the rear, to tend to turn fuselage 12 to the right.

It will be appreciated without a detailed explanation that a decrease in assumed air speed or a movement ahead of the throttle lever will result in a movement ahead of link 673, and the fuselage will have a tendency to turn to the left imparted thereto.

Means responsive to the link 673 for controlling the rotation of the fuselage 12 to simulate the turning of a plane in actual flight in response to changes in the throttle lever setting and in the air speed of the plane will now be described.

In Fig. 15 it will be seen that a pair of rods 674 are provided, these rods being held by the brackets 675 which may be attached in any desired manner to the interior of fuselage 12. Pivoted upon the left rod 674 is the left rudder pedal 676, and pivoted upon the right rod 674 is the right rudder pedal 677. The rear end of link 678 is connected to pedal 676, and the forward end of this link is connected to the left end of the rudder bar 680. The rear end of link 679 is similarly connected to the right rudder pedal 677, and the forward end of this link is connected to the right end of rudder bar 680. This rudder bar is held by bracket 681 and stud 681a to pivot about this stud.

Pivotally attached to the left end of rudder bar 680 is the forward end of link 682, the rear end of which is attached to the outer end of the arm 683 integral with the upper leaf 683 of the rudder centering valve designated generally by 684. The central leaf of valve 684 is designated 685, and the lower fixed leaf is numbered 686. Integral with the center leaf 685 is the arm 685a, to the outer end of which is pivotally attached the right end of link 687. The left end of link 687 is attached to one arm of bell crank 688, arranged to pivot about stud 689, and the forward end of the previously mentioned link 683 is pivotally connected to the other arm of bell crank 688.

The rudder centering valve 684 has a stem 684a which, as is well known to those skilled in the art, is connected to a suitable source of reduced pressure, and the upper leaf 683 of this valve has a pair of atmospheric vents 684b. Connected to the valve 684 are a pair of pneumatic lines 690 and 691, the first of which connects to the left rudder pedal bellows 692 and the other of which connects to the right rudder pedal bellows 693. The rear portion of each of these bellows is movable in response to a change in the pressure therewithin, and the rear surface of bellows 692 is connected through link 694 to the left rudder pedal 676 while the rear movable surface of bellows 693 is connected through link 695 to the right rudder pedal 677. The front surface of each of these two bellows may be affixed to any suitable fixed member within fuselage 12.

The right end of the rudder bar 680 is connected to the forward end of link 696, the rear end of which is connected to the upper leaf 697 of the conventional rudder valve designated by 698. This valve includes a lower fixed leaf 699 which carries the stem 699a which is connected to a suitable source of reduced pressure. A pair of atmospheric vents 697b are placed in the upper leaf 697, and a pair of pneumatic leads 700 connect with the turning motor 22 of Fig. 1.

All of the apparatus shown in Fig. 15 with the exception of the novel rate of turn computer is well known to the prior art and does not form any part of my invention except when combined with the novel computing arrangement disclosed herein. Accordingly, it is not felt necessary to further describe the apparatus disclosed in Fig. 15, but for a complete description thereof reference may be had to the above mentioned application of Karl A. Kail, Serial Number 619,361 filed September 29, 1945, for Aviation Trainer.

For the purpose of understanding the operation of my invention, it is sufficient to know that upon a forward movement of the left rudder pedal 676 the link 678 rotates rudder bar 680 clockwise, moving link 682 ahead and resulting in a clockwise rotation of the upper leaf 683 of the rudder centering valve 684. This rotation of leaf 683 results in an application of atmosphere to the pneumatic line 690 and of vacuum to the pneumatic line 691. Bellows 692 expands and bellows 693 contracts, thereby resisting a forward motion of rudder pedal 676, to simulate the loading of the rudder pedals of a plane in actual flight. The collapsing of bellows 693 will resist the forward movement of the left rudder pedal 676 because such a collapsing tends to move link 695 ahead. The rudder pedal 677 will tend to move in the same direction as will the link 679 connected to the right end of rudder bar 680. Accordingly, the bellows 693 will resist the clockwise motion of rudder bar 680 caused by a pressing forward of the left rudder pedal 676.

As the rudder bar 680 rotates clockwise by the forward movement of the left rudder pedal, the link 696 will move to the rear, rotating the upper leaf 697 of the rudder valve 698 counterclockwise as seen from above. Vacuum and atmosphere will be selectively admitted to the pneumatic lines 700 to the turning motor shown in Fig. 1, to cause the fuselage 12 to rotate to the left.

On the other hand, when the right rudder pedal 677 is moved ahead the upper leaf 683 of the rudder centering valve 684 is rotated counterclockwise as seen from above, resulting in a reversing of vacuum and atmosphere in the lines 690 and 691, and causing bellows 693 to expand and bellows 692 to contract. These bellows will resist the forward motion of rudder pedal 677, and the forward movement of this rudder pedal and the counterclockwise rotation of the rudder bar 680 will result in a clockwise rotation of the upper leaf 697 of the rudder valve 698, resulting in a reversal of the vacuum and atmosphere in pneumatic link 700, causing the trainer fuselage 12 to rotate toward the right.

Inasmuch as a clockwise rotation of the upper leaf 683 of the rudder centering valve 684 results in a turning of fuselage 12 to the left, it will be appreciated that a counterclockwise rotation of the center leaf 685 will have the same effect. This principle of three leaf valve arrangement is well understood by those skilled in the art. Accordingly, when the link 673 moves to the rear in response to an increase in the factor of assumed air speed or to a retarding of the throttle lever 160, the counterclockwise rotation of bell crank 688 results in a movement to the left of link 687 and in a counterclockwise rotation of the center leaf 685 of valve 684. Vacuum will be admitted to the pneumatic line 691 and atmosphere to the pneumatic line 690, resulting in an expansion of bellows 692 and in a contraction of bellows 693. The right rudder pedal 677 will move ahead and the left rudder pedal 676 will move to the rear, resulting in a counterclockwise rotation of the rudder bar 680 and in a forward movement of the link 696 which connects the rudder bar with the upper leaf 697 of the rudder valve 698. The upper leaf 698 will be rotated clockwise as seen from above, resulting in a turning of fuselage 12 to the right.

On the other hand, when link 673 moves to the rear as a result of an increase in assumed air speed or as a result of a forward movement of the throttle lever 169, the center leaf 685 of the rudder centering valve 684 will be rotated counterclockwise, resulting in an application of vacuum to the pneumatic line 690 and of atmosphere to the pneumatic line 691. Bellows 692 will contract and bellows 693 will expand, causing rudder pedal 676 to move ahead and rudder pedal 677 to move to the rear. The resulting clockwise rotation of the rudder bar 680 will result in a movement to the rear of link 679 and in a counterclockwise rotation of the upper leaf 697 of the rudder valve 698. Vacuum and atmosphere will be selectively applied to the pneumatic line 700 to cause the fuselage 12 to rotate toward the left.

Accordingly, a movement to the rear of the throttle lever 160 and an increase in the factor of assumed air speed results in a tendency of fuselage 12 to move to the right, while a movement ahead of the throttle lever and an increase in assumed air speed imparts a tendency of the fuselage 12 to turn to the left. It will be appreciated that movements of the throttle lever 160 affect the position of the parts of the computer shown in Fig. 15 relatively soon after the movements of the throttle lever occur. Accordingly, the tendency of the fuselage 12 to have its heading changed in response to a setting of the throttle lever occurs relatively soon after the throttle lever movement occurs. However, the position of links 665 and 665a in Fig. 15 as a result of a change in the factor of assumed air speed, which change in assumed air speed occurs as a result of the setting of the throttle lever, is a delayed action because it is necessary for the change in throttle lever setting to travel through the engine computer and flight computer before the change in position of link 665 occurs. Accordingly, the torque effect caused by a change in the setting of the throttle lever occurs relatively soon, and the cancelling effect of the change in air speed which is also caused by the same movement of the throttle lever is delayed for a predetermined length of time, corresponding to the actual situation in the flight of an aircraft.

In Fig. 15, the rudder trimming control 681 is provided in order that the fuselage 12 may be "trimmed" for maintaining the fuselage 12 upon a constant heading regardless of the instant assumed air speed and instant throttle lever setting. If the throttle lever setting and assumed air speed are such that the fuselage 12 tends to turn to the right, when no pressure is applied to the rudder pedals, the control knob 681 may be used to neutrally position the link 673 in order to center the rudder centering valve 684, to eliminate the turning of the trainer. On the other hand, should the assumed air speed and throttle lever setting be such that the link 673 is positioned to turn the fuselage 12 to the left, in the absence of the application of pressure to the rudder pedals, the control knob 681 may be used to recenter link 673 to eliminate this undesired turning.

Figure 16:
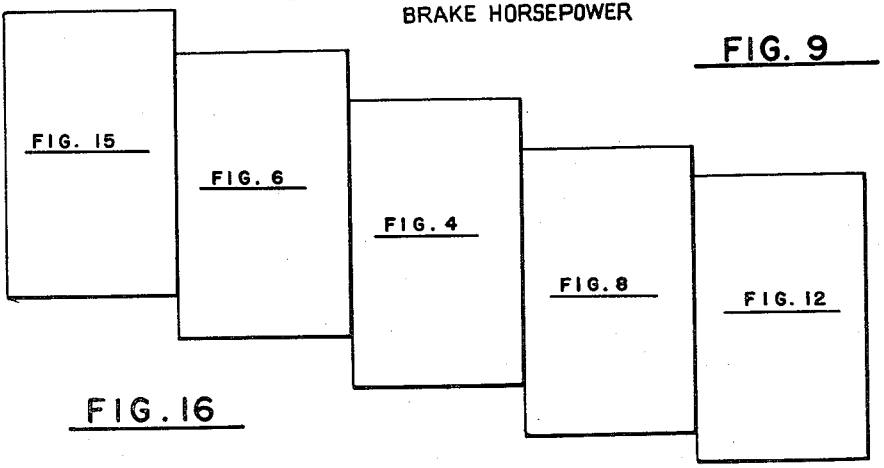
Fig. 16 is a schematic drawing showing the relative positions in which the drawings of this application may be placed in order to show the apparatus of this invention in one view.

Through the apparatus shown in Fig. 16 the rudder valve 867 is operated to decrease the rate of turning of fuselage 12 to the left. By means of the rudder trimming apparatus 865 the student may trim the rudder valve 867 so that the fuselage 12 will continue on a constant heading in the presence of the increased assumed engine power output.

On the other hand when the throttle lever 160 in Fig. 15 is moved to the rear to decrease the assumed engine power output link 860 also moves to the rear and through the apparatus schematically shown in Fig. 16 the rudder valve 867 is operated to turn fuselage 12 to the right. Then as the factor of assumed air speed decreases in response to the lower assumed engine power output the rotation of shaft 770 and arm 883 in Fig. 15 results in a movement to the rear of link 864, shown in Fig. 15. Through the apparatus schematically shown in Fig. 16 this movement of link 864 will result in an operation of the rudder valve 867 to decrease the rate of turning of fuselage 12 to the right. By means of the rudder trimming apparatus 865 the student in the trainer also may trim the rudder valve to keep the fuselage 12 on a constant heading in the presence of the lower assumed engine power output.

Conclusion

In view of the preceding disclosure, it will be appreciated that this invention discloses a completely novel form of computing apparatus for use in aviation trainers to compute instantaneous variable outputs the magnitude of which are dependent upon the value of two or more variable inputs. Computers incorporating the substance of my invention may be designed for computing any selected variable output which depends upon two or more variable inputs. The arrangement of parts of the computers built in accordance with the principles of my invention may take widely different forms, selected by the designer of the computers to suit the particular situation at hand. Accordingly, my invention is not limited to the production of the specific units disclosed herein nor to the production of units having the specific input variables and output variables disclosed herein.

All such uses of my invention and changes in the disclosed embodiments are intended to be covered by the following claims.

I claim:

1. A computer for use in grounded aviation trainers and the like comprising a first fixed pivot, a first arm mounted thereupon, a first linkage having a first end pivotally attached to the outer end of said arm, a second fixed pivot, a second arm mounted upon the second pivot, a second linkage having a first end pivotally connected to the outer end of said second arm, and a master pivot pivotally connecting the second end of each of said linkages, separate means selectively connected to each of said arms for positioning each of said arms about its fixed pivot in response to changes in the value of a different input variable to position the master pivot in accordance with the combined values of the input variables, a third fixed pivot, a second pair of arms each held by said fixed pivot, a second pair of linkages each having a first end pivoted to the outer end of a different one of each of said second pair of arms, the second end of each of said second pair of linkages being pivotally held by a second master pivot, means interconnecting the first master pivot and the second master pivot to move the second master pivot and to move the second pair of arms about the third fixed pivot in response to changes in the position of said first master pivot, and separate output means each responsive to the position of a different one of said second pair of arms about the third fixed pivot.

2. The apparatus of claim 1, in which the means connected to the first arm for positioning the same about the first fixed pivot in response to changes in the value of the first input variable is a manual control representing the throttle control of a real plane, and the means connected to the second arm for positioning the same about the second fixed pivot in response to changes in the value of the second input variable is a second manual control representing the engine speed control of a real plane.

3. The apparatus of claim 2, in which the output means connected to the master pivot to be responsive to the position of the master pivot includes an instrument representing the manifold pressure gauge of a real plane.

4. A computing mechanism for use in grounded aviation trainers and the like comprising a first fixed pivot, an arm mounted upon said pivot, a second pivot carried by said arm, a second and a third arm carried by said second pivot, means for moving said second arm about the second pivot in response to changes in the value of two or more input variables, means forming a part of said trainer operable in response to changes in the value of a third input variable, means interconnecting said second and third arms for moving said third arm about the second pivot in response to movements of said second arm about the second pivot, means operable in response to the operation of said means operable in response to changes in the value of the third input variable for varying the displacement of said third arm from said second arm, and output means responsive to the position of said third arm.

H. FREDERICK SCHAEFER, Jr.

REFERENCES CITED

The following references are of record in the file of this patent:

UNITED STATES PATENTS

| Number | Name | Date |
| --- | --- | --- |
| 1,181,388 | Joiner | May 2, 1916 |
| 2,093,254 | Spitzglass et al. | Sept. 14, 1937 |
| 2,284,795 | Belaef | June 2, 1942 |
| 2,340,350 | Svoboda | Feb. 1, 1944 |
| 2,366,603 | Dehmel | June 2, 1945 |
| 2,394,180 | Imm | Feb. 5, 1946 |

FOREIGN PATENTS

| Number | Country | Date |
| --- | --- | --- |
| 22,891 | France | Mar. 10, 1921 |
| 33,480 | Holland | July 17, 1934 |
| 113,136 | Great Britain | Feb. 7, 1918 |
| 144,893 | Switzerland | May 16, 1931 |
| 305,140 | Italy | Jan. 27, 1933 |
| 408,803 | Great Britain | Apr. 19, 1934 |
| 548,093 | Great Britain | Sept. 24, 1942 |
| 668,791 | France | July 22, 1929 |
| 851,276 | France | Oct. 2, 1939 |

OTHER REFERENCES

A. Svoboda: Computing Mechanisms and Linkages, volume 27 of MIT Radiation Lab. Series, 1st edition, 1948, McGraw-Hill Co.